US012620736B2

(12) United States Patent
Choi et al.

(10) Patent No.: US 12,620,736 B2
(45) Date of Patent: May 5, 2026

(54) CONNECTOR AND ELECTRONIC DEVICE INCLUDING THE SAME

(71) Applicant: SAMSUNG ELECTRONICS CO., LTD., Suwon-si (KR)

(72) Inventors: Junhwa Choi, Suwon-si (KR); Jongwan Shim, Suwon-si (KR); Jeongseob Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 405 days.

(21) Appl. No.: 18/339,578

(22) Filed: Jun. 22, 2023

(65) Prior Publication Data

US 2023/0387616 A1 Nov. 30, 2023

Related U.S. Application Data

(63) Continuation of application No. PCT/KR2023/006479, filed on May 12, 2023.

(30) Foreign Application Priority Data

May 30, 2022 (KR) ........................ 10-2022-0065914
Jul. 22, 2022 (KR) ........................ 10-2022-0090696

(51) Int. Cl.
*H01R 12/71* (2011.01)
*H01R 12/73* (2011.01)
*H01R 107/00* (2006.01)

(52) U.S. Cl.
CPC ......... *H01R 12/716* (2013.01); *H01R 12/732* (2013.01); *H01R 2107/00* (2013.01)

(58) Field of Classification Search
CPC .... H01R 12/716; H01R 24/60; H01R 12/724; H01R 12/732; H01R 13/6585; H01R 13/6596

(Continued)

(56) References Cited

U.S. PATENT DOCUMENTS 9,509,098 B1 11/2016 Henry
2015/0056566 A1 2/2015 Moon (Continued)

FOREIGN PATENT DOCUMENTS

CN 106684610 A 5/2017
CN 106684621 B 3/2023

(Continued)

OTHER PUBLICATIONS

Written Opinion dated Aug. 17, 2023 in International Patent Application No. PCT/KR2023/006479.

(Continued)

*Primary Examiner* — Abdullah A Riyami
*Assistant Examiner* — Amara Anderson
(74) *Attorney, Agent, or Firm* — Nixon & Vanderhye, P.C.

(57) ABSTRACT

An example electronic device may include a connector; and a printed circuit board electrically connected to the connector, wherein the connector may include: a mid plate that includes a first surface and a second surface opposite to the first surface; a plurality of terminals; and an insulating structure in which at least a part of the mid plate is disposed and supporting at least some of the plurality of terminals, wherein the plurality of terminals may include a ground terminal that is disposed to be spaced apart at least in part in a first direction or in a second direction opposite to the first direction with respect to the mid plate, is extended in a length direction of the connector, and is in contact with the mid plate at one end thereof and is in contact with the printed circuit board at the other end thereof.

20 Claims, 15 Drawing Sheets

(58) Field of Classification Search
USPC .............................................................. 439/74
See application file for complete search history.

(56) References Cited

U.S. PATENT DOCUMENTS

| | | | | |
|---|---|---|---|---|
| 2015/0255925 | A1 | 9/2015 | Katayanagi | |
| 2016/0072242 | A1* | 3/2016 | Yu | H01R 24/70 439/95 |
| 2016/0226167 | A1* | 8/2016 | Ito | H01R 12/712 |
| 2016/0322759 | A1 | 11/2016 | Park et al. | |
| 2016/0372870 | A1* | 12/2016 | Guo | H01R 24/60 |
| 2017/0358895 | A1 | 12/2017 | Chung | |
| 2018/0366884 | A1 | 12/2018 | Tseng | |
| 2021/0013682 | A1* | 1/2021 | Zhang | H01R 43/16 |
| 2021/0399507 | A1* | 12/2021 | Wu | H01R 13/6586 |

FOREIGN PATENT DOCUMENTS

| | | | |
|---|---|---|---|
| JP | 2016-143455 | | 8/2016 |
| JP | 2020071954 | A | 5/2020 |
| JP | 3229438 | U | 11/2020 |
| KR | 20150024245 | A | 3/2015 |
| KR | 20150105211 | A | 9/2015 |
| KR | 20160101520 | A | 8/2016 |
| KR | 20170138789 | A | 12/2017 |
| KR | 20170139200 | A | 12/2017 |
| KR | 10-2018-0044788 | | 5/2018 |
| KR | 20180136865 | A | 12/2018 |
| KR | 10-2019-0045500 | | 5/2019 |
| KR | 20200008824 | A | 1/2020 |
| KR | 10-2020-0109158 | | 9/2020 |
| KR | 20200109159 | A | 9/2020 |
| KR | 20210004774 | A | 1/2021 |
| KR | 20220003891 | A | 1/2022 |
| KR | 20220018158 | A | 2/2022 |
| KR | 102372670 | B1 | 3/2022 |

OTHER PUBLICATIONS

Search Report dated Aug. 17, 2023 in International Patent Application No. PCT/KR2023/000558.

* cited by examiner

CONNECTOR AND ELECTRONIC DEVICE INCLUDING THE SAME

CROSS-REFERENCE TO RELATED APPLICATIONS

This application is a continuation of International Application No. PCT/KR2023/006479, designating the United States, filed on May 12, 2023, in the Korean Intellectual Property Receiving Office and claiming priority to Korean Patent Application No. 10-2022-0065914, filed on May 30, 2022 in the Korean Intellectual Property Office and to Korean Patent Application No. 10-2022-0090696 filed on Jul. 22, 2022 in the Korean Intellectual Property Office. The disclosures of each of these applications are incorporated by reference herein in their entireties.

BACKGROUND

Field

The disclosure relates to a connector and an electronic device including the same.

Description of Related Art

An electronic device may include a connector for data communication and power supply. Connectors may include a receptacle connector and a plug connector coupled correspondingly thereto. A receptacle connector may be disposed on the printed circuit board of the electronic device and may be electrically connected to a corresponding plug connector.

A receptacle connector may include plural terminals, a mid plate, an insulating structure supporting the plural terminals, and a shell surrounding individual elements. The plural terminals may include a terminal for transmitting data, a terminal for supplying power, and a ground terminal connected to the board.

SUMMARY

A receptacle connector may be connected to a plug connector at a first (e.g., a front) end and may be connected to the printed circuit board at a second (e.g., a rear) end. The ground terminal of the receptacle connector may be electrically connected to the printed circuit board at the rear end of the connector, but may be disposed separately from the mid plate at the front end of the connector.

When the connector transmits a super-high-speed signal (e.g., Superspeed, Thunderbolt), because the mid plate and the ground terminal are not connected at the front end of the connector, the connector may act as an antenna emitting noise, and the loss of a high-frequency signal may increase because a return path of the current is lengthened.

Various embodiments of the disclosure may provide a connector capable of reducing noise emission and reducing loss of a high-frequency signal.

An electronic device according to various embodiments of the disclosure may include: a connector; and a printed circuit board electrically connected to the connector, wherein the connector may include: a mid plate that includes a first surface and a second surface opposite to the first surface; a plurality of terminals; and an insulating structure in which at least a part of the mid plate is disposed and supporting at least some of the plurality of terminals, wherein the plurality of terminals may include a ground terminal that is disposed to be spaced apart at least in part in a first direction or in a second direction opposite to the first direction with respect to the mid plate, is extended in a length direction of the connector, and is in contact with the mid plate at one end and is in contact with the printed circuit board at the other end, wherein the ground terminal disposed in the first direction with respect to the mid plate may be bent at one end of the ground terminal in a direction toward the first surface of the mid plate and extended to come into contact with the first surface of the mid plate, wherein the ground terminal disposed in the second direction with respect to the mid plate may be bent at one end of the ground terminal in a direction toward the second surface of the mid plate and extended to come into contact with the second surface of the mid plate.

A connector according to various embodiments of the disclosure may include: a mid plate that includes a first surface and a second surface opposite to the first surface; a plurality of terminals; and an insulating structure in which at least a part of the mid plate is disposed and supporting at least some of the plurality of terminals, wherein the plurality of terminals may include a ground terminal that is disposed to be spaced apart at least in part in a first direction or in a second direction opposite to the first direction with respect to the mid plate, is extended in a length direction of the connector, and is in contact with the mid plate at one end, wherein the ground terminal disposed in the first direction with respect to the mid plate may be bent at one end of the ground terminal in a direction toward the first surface of the mid plate and extended to come into contact with the first surface of the mid plate, wherein the ground terminal disposed in the second direction with respect to the mid plate may be bent at one end of the ground terminal in a direction toward the second surface of the mid plate and extended to come into contact with the second surface of the mid plate.

A connector and an electronic device including the same according to various embodiments of the disclosure may include a ground terminal in contact with at least a portion of the mid plate, thereby reducing the return path of the current.

In the connector and the electronic device including the same according to various embodiments of the disclosure, signal integrity (SI) of the connector can be improved by reducing the return path of the current.

In the connector and the electronic device including the same according to various embodiments of the disclosure, noise emission of the connector can be decreased by reducing the return path of the current.

In the connector and the electronic device including the same according to various embodiments of the disclosure, by relatively increasing the thickness of the ground terminal at a portion in contact with the mid plate, heat dissipation can be improved and heat generation of the electronic device can be reduced.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
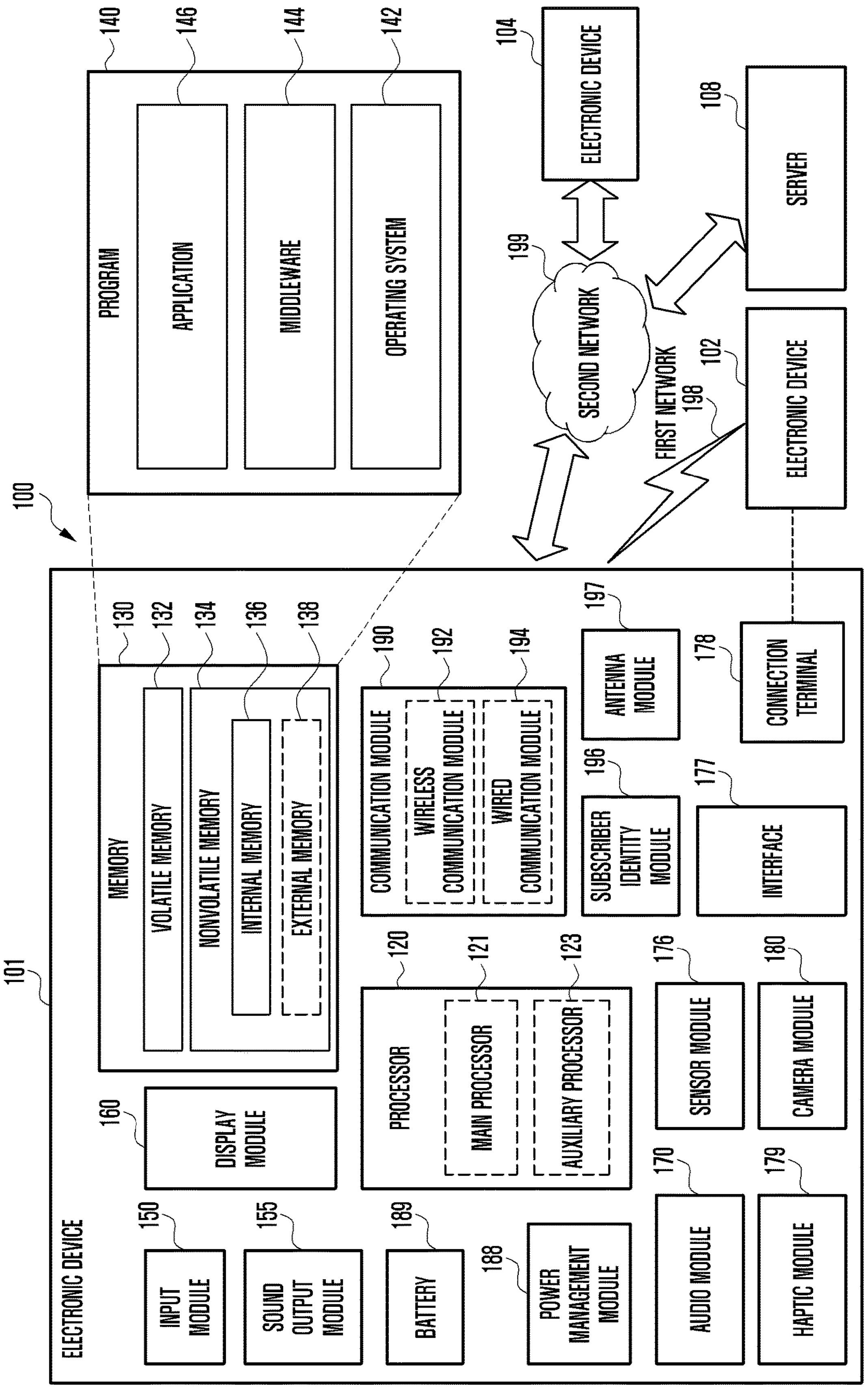
FIG. 1 is a block diagram of an example electronic device in a network environment according to various embodiments.

FIG. 1 is a block diagram illustrating an example electronic device in a network environment according to various embodiments. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter(mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
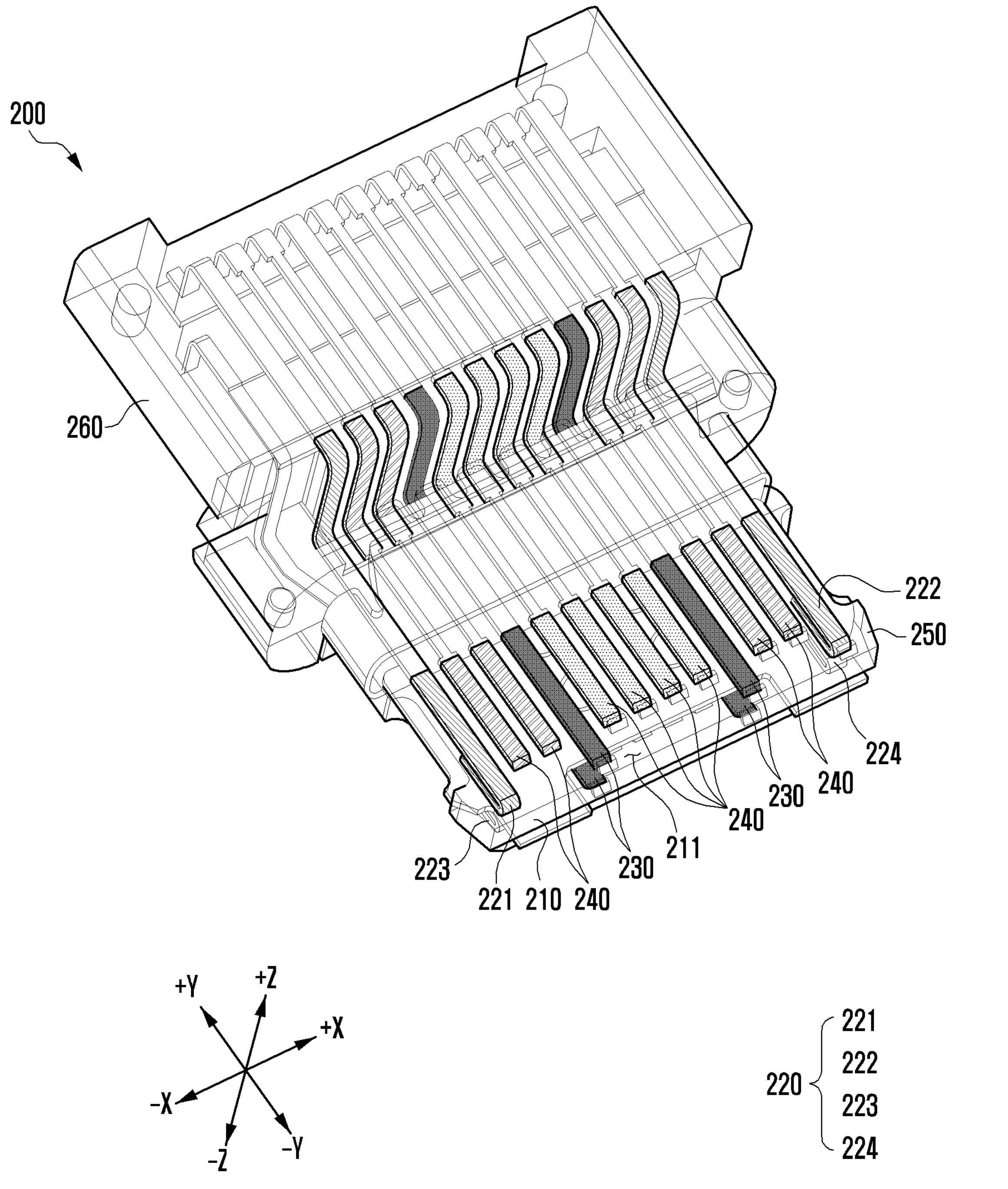
FIG. 2 is a perspective view of an example connector according to various embodiments.

FIG. 2 is a perspective view of an example connector 200 according to various embodiments.

The connector 200 according to various embodiments may include a mid plate 210, ground terminals 220, power terminals 230, signal terminals 240, an insulating structure 250, and/or a shell 260.

In various embodiments, the width direction of the connector 200 may refer, for example, to the x-axis direction, and the length direction of the connector 200 may refer, for example, to the y-axis direction. The height direction of the connector 200 may refer, for example, to the z-axis direction.

In various embodiments, a first direction may refer, for example, to the positive z-axis direction, and a second direction may refer, for example, to a negative z-axis direction opposite to the first direction.

The connector 200 according to various embodiments may be a receptacle connector. The connector 200 according to various embodiments may be coupled to an external plug connector (not shown). For example, a plug connector (not shown) may be disposed at the front end (e.g., end portion located in the negative y-axis direction of the connector 200) of the connector 200 according to various embodiments, and the connector 200 and the plug connector (not shown) may be coupled. The connector 200 and the plug connector (not shown) may be coupled to exchange electrical signals with each other.

In various embodiments, the ground terminals 220, power terminals 230, and/or signal terminals 240 may be disposed in the first and second directions with respect to the mid plate 210. The ground terminals 220, power terminals 230, and/or signal terminals 240 may be disposed symmetrically with respect to the mid plate 210.

In various embodiments, at least a portion of the mid plate 210 may be disposed inside the insulating structure 250. The mid plate 210 may be inserted into the insulating structure 250 through insert molding.

In various embodiments, at least a portion of the mid plate 210 may be located outside the insulating structure 250. For example, at least portions of the mid plate 210 may be exposed to the outside of the insulating structure 250 on one side (e.g., in the positive x-axis direction relative to the insulating structure) and the other side of the insulating structure 250.

In various embodiments, the mid plate 210 may include a conductive material. For example, the mid plate 210 may include a metal material.

In various embodiments, the mid plate 210 may include a plate groove 211 at least in part. The plate groove 211 may be formed in a shape in which a portion of the mid plate 210 is concavely recessed toward the length direction (e.g., positive y-axis direction) of the connector 200. The plate groove 211 may be formed to be extended along the width direction (e.g., x-axis direction) of the connector 200.

In various embodiments, at least a portion of the ground terminal 220 may come into contact with the mid plate 210. For example, the ground terminal 220 may be in contact with the mid plate 210 at one end (e.g., end portion of the ground terminal 220 toward the negative y-axis direction).

In various embodiments, the power terminal 230 may serve to supply power to electrical objects (not shown) connected to the connector 200. For example, when the connector 200 according to various embodiments of the disclosure is coupled to a plug connector (not shown), the power terminal 230 may be electrically connected to a power terminal (not shown) of the plug connector (not shown) to thereby supply power to a printed circuit board (not shown) connected to the connector 200.

According to various embodiments, the signal terminal 240 may serve to transmit and receive electrical signals. For example, when the connector 200 according to various embodiments of the disclosure is coupled to an externally located plug connector (not shown), the signal terminal 240 of the connector 200 may be electrically connected to a signal terminal (not shown) of the plug connector (not shown) to thereby transmit and receive data signals.

In various embodiments, the signal terminal 240 of the connector 200 may transmit a super high-speed signal having a short wavelength (e.g., Superspeed, Thunderbolt).

In the connector 200 according to various embodiments, even if the signal terminal 240 transmits a super high-speed signal, as one end of the ground terminal 220 is in contact with and is connected to the mid plate 210, the loss of a high-frequency signal and noise emission can be reduced.

In various embodiments, the ground terminal 220, the power terminal 230, and the signal terminal 240 may be extended along the length direction (e.g., y-axis direction) of the connector 200.

In various embodiments, the ground terminal 220, the power terminal 230, and the signal terminal 240 may be extended along the length direction (e.g., y-axis direction) of the connector 200, be bent at least in part, and be extended in the height direction (e.g., z-axis direction) of the connector 200.

In various embodiments, the ground terminal 220 may include a first ground terminal 221, a second ground terminal 222, a third ground terminal 223, and/or a fourth ground terminal 224.

In various embodiments, the first ground terminal 221 and the second ground terminal 222 may be disposed to be spaced apart from the mid plate 210 in a first direction (e.g., positive z-axis direction) with respect to the mid plate 210. The third ground terminal 223 and the fourth ground terminal 224 may be disposed to be spaced apart from the mid plate 210 in the second direction (e.g., negative z-axis direction) with respect to the mid plate 210.

In various embodiments, the first surface of the mid plate 210 may refer to a surface of the mid plate 210 facing at right angles to the positive z-axis direction, and the second surface of the mid plate 210 may refer to a surface of the mid plate 210 facing at right angles to the negative z-axis direction.

In various embodiments, the ground terminal 220 disposed in the first direction with respect to the mid plate 210 may be bent at one end of the ground terminal 220 and be extended toward the first surface of the mid plate 210 to come into contact with the first surface of the mid plate 210.

In various embodiments, the ground terminal 220 disposed in the second direction with respect to the mid plate 210 may be bent at one end of the ground terminal 220 and be extended toward the second surface of the mid plate 210 to come into contact with the second surface of the mid plate 210.

In various embodiments, at least a portion of the ground terminal 220 may be placed to be spaced apart from the mid plate 210. For example, the insulating structure 250 may be disposed between at least a portion of the ground terminal 220 and the mid plate 210, so that at least a portion of the ground terminal 220 and the mid plate 210 can be spaced apart from each other.

In various embodiments, the insulating structure 250 may be disposed between the mid plate 210 and the power terminal 230 (and/or the signal terminal 240), so that the mid plate 210 and the power terminal 230 (and/or the signal terminal 240) can be electrically separated.

In various embodiments, the insulating structure 250 may include an insulating material. For example, the insulating structure 250 may include plastic resin. The insulating structure 250 may include an insulating material to thereby prevent a short circuit between terminals (e.g., signal terminal 240).

In various embodiments, the insulating structure 250 may support at least a portion of each terminal (e.g., ground terminal 220, power terminal 230, signal terminal 240). The insulating structure 250 may support each terminal and cause at least a portion of each terminal to be spaced apart from the mid plate 210. For example, the ground terminal 220, the power terminal 230, and the signal terminal 240 placed in the first direction with respect to the mid plate 210 may be supported by the insulating structure 250 to maintain a distance from the mid plate 210.

In various embodiments, each terminal (e.g., ground terminal 220, power terminal 230, signal terminal 240) may be arranged at a preset interval from at least a portion of the insulating structure 250. For example, the ground terminal 200, the power terminal 230, and the signal terminal 240 may be disposed on one surface of the insulating structure 250 (e.g., surface of the insulating structure 250 facing the positive z-axis direction), and may be disposed at preset intervals in the width direction of the connector 200 (e.g., x-axis direction).

In various embodiments, one surface of the insulating structure 250 may refer, for example, to a surface of the insulating structure 250 facing the positive z-axis direction, and the other surface of the insulating structure 250 may refer, for example, to a surface of the insulating structure 250 facing the negative z-axis direction.

In various embodiments, at least some of the ground terminals 220, power terminals 230, and signal terminals 240 may be disposed on the insulating structure 250. For example, at least some of the ground terminals 220, power terminals 230, and signal terminals 240 may be disposed on one surface of the insulating structure 250 and the other surface of the insulating structure 250.

In various embodiments, the shell 260 may be disposed to surround at least a portion of the mid plate 210, the ground terminal 220, the power terminal 230, and/or the signal terminal 240. For example, the shell 260 may be formed to surround the outer periphery of the mid plate 210 and be extended in the length direction of the connector 200.

In various embodiments, the shell 260 may include a conductive material. For example, the shell 260 may include a metal material. The shell 260 may serve to physically protect components located inside the shell 260.

In various embodiments, the shell 260 may serve to block external noise and/or electromagnetic waves emitted from the inside.

The electronic device 101 according to various embodiments of the disclosure may include the connector 200 and/or a printed circuit board (not shown). The printed circuit board (not shown) may be in contact with at least a portion of the connector 200. For example, the ground terminal 220 of the connector 200 may be in contact with the mid plate 210 at one end and be in contact with the printed circuit board (not shown) at the other end.

The electronic device 101 including the connector 200 according to various embodiments may include an electronic device of notebook PC type (not shown) or an electronic device of tablet PC type (not shown). However, the type of the electronic device 101 according to various embodiments is not limited thereto and may include various types of electronic devices including the connector 200.

The connector 200 according to various embodiments may be a connector 200 that satisfies the universal serial bus (USB) type-C pin configuration.

The connector 200 according to various embodiments includes a ground terminal 220 in contact with the mid plate 210 at least in part, which can improve signal integrity (SI)

of the connector 200 by reducing the return path of the current. In addition, the connector 200 may reduce noise emission by reducing the return path of the current.

The connector 200 according to various embodiments includes a ground terminal 220 in contact with the mid plate 210 at least in part, which can reduce electrostatic discharge (ESD) or electrical overstress (EOS).

The electronic device 101 including the connector 200 according to various embodiments includes a ground terminal 220 in contact with the mid plate 210 at least in part, so that Wi-Fi performance of the electronic device 101 can be improved.

Figure 3:
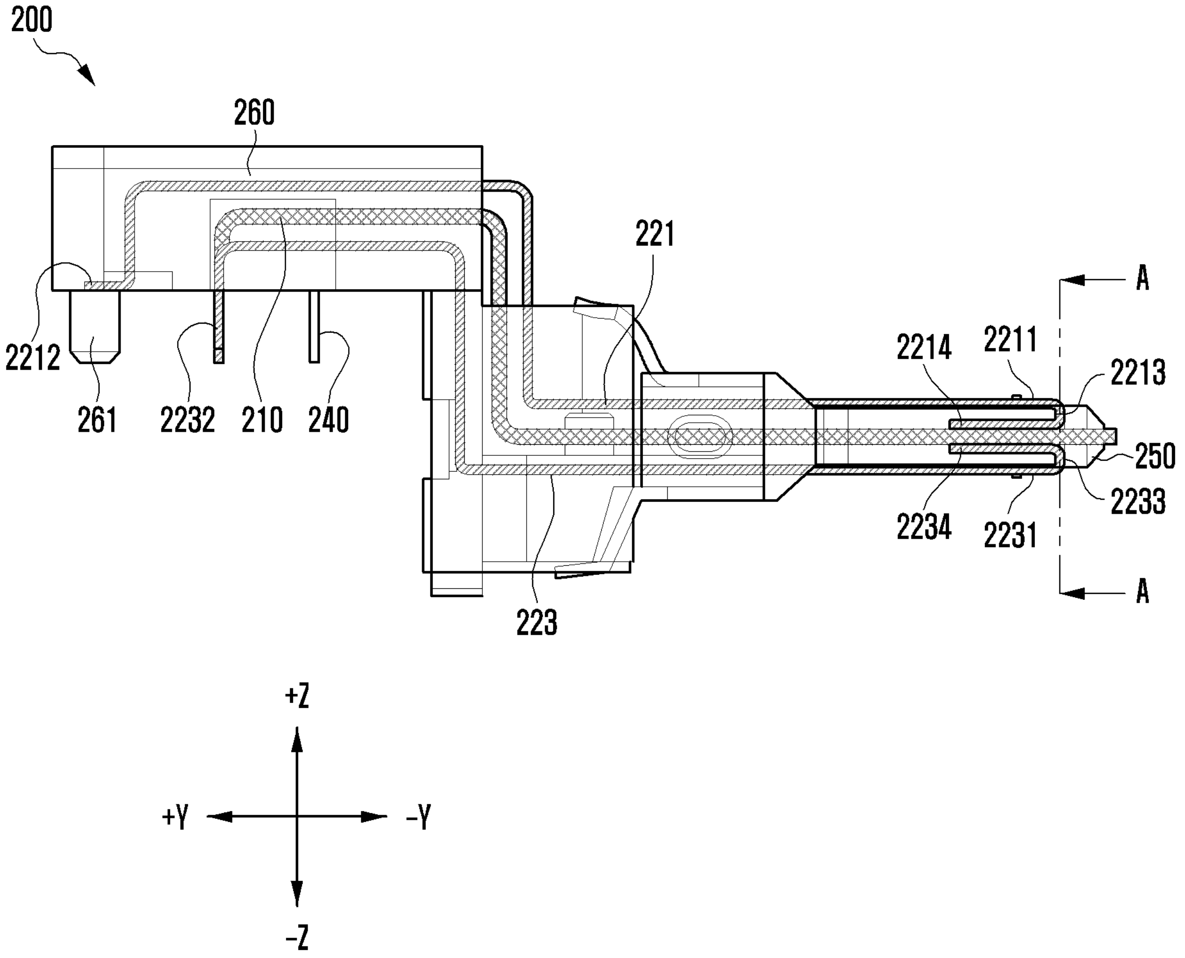
FIG. 3 is a side view of an example connector according to various embodiments.

FIG. 3 is a side view of the example connector 200 according to various embodiments.

FIG. 3 shows the first ground terminal 221 and the third ground terminal 223, but the configuration in which the second ground terminal 222 (see FIG. 2) and the fourth ground terminal 224 (see FIG. 2) are extended may, for example, also be formed in the same way as the first ground terminal 221 and the third ground terminal 223. In the following description, descriptions regarding the first ground terminal 221 and the third ground terminal 223 may be equally applied to the second ground terminal 222 and the fourth ground terminal 224.

With reference to FIG. 3, the first ground terminal 221 and the third ground terminal 223 may be extended along the length direction (e.g., y-axis direction) and the height direction (e.g., z-axis direction) of the connector 200.

In various embodiments, the ground terminal 221 or 223 may be bent and extended at least in part. For example, the ground terminal 221 or 223 may be extended in the longitudinal direction of the connector 200 and then be bent and extended in the height direction of the connector. The ground terminals 221 and 223 may be extended in the height direction of the connector 200 and then be bent and extended in the length direction of the connector.

With reference to FIG. 3, the mid plate 210 may be extended along the length direction (e.g., y-axis direction) and the height direction (e.g., z-axis direction) of the connector 200. The mid plate 210 may be extended while maintaining a distance from the first ground terminal 221 and the third ground terminal 223 at least in part.

In various embodiments, the ground terminal 221 or 223 may include a first region 2211 or 2231 and a second region 2212 or 2232. The first region 2211 or 2231 may be a region located at one end of the ground terminal 221 or 223 (e.g., end portion toward the negative y-axis direction). The second region 2212 or 2232 may be a region located at the other end of the ground terminal 221 or 223 (e.g., end portion toward the positive y-axis direction).

With reference to FIG. 3, the first ground terminal 221 may be bent in the first region 2211 of the first ground terminal 221 and extended toward the first surface of the mid plate 210 (e.g., surface of the mid plate 210 facing at right angles to the positive z-axis direction) to come into contact with the mid plate 210.

In various embodiments, the first ground terminal 221 may include a bending region 2213 and/or a contact region 2214.

In various embodiments, the bending region 2213 of the first ground terminal 221 may be a region that is connected to the first region 2211 located at one end of the first ground terminal 221 and is extended in the height direction (e.g., z-axis direction) of the connector 200. For example, the first ground terminal 221 may be extended in the length direction of the connector 200 in the first region 2211 located at one end of the first ground terminal 221 and then be bent in the height direction of the connector 200 to be connected to the bending region 2213.

In various embodiments, the contact region 2214 of the first ground terminal 221 may refer, for example, to a region that is connected to the bending region 2213 and is extended in the length direction (e.g., y-axis direction) of the connector 200. For example, the first ground terminal 221 may be extended in the height direction of the connector 200 in the bending region 2213 and then be bent in the length direction of the connector 200 to be connected to the contact region 2214.

In various embodiments, the first ground terminal 221 may be in contact with the first surface of the mid plate 210 in the contact region 2214.

In various embodiments, the contact region 2214 may be a region extending from the bending region 2213 toward the positive y-axis direction. The extension length of the contact region 2214 may be formed to be about 1 mm or more.

FIG. 3 shows the first ground terminal 221, but the configuration in which the second ground terminal 222 (see FIG. 2) contacts the mid plate 210 may also be formed in the same way as the first ground terminal 221. For example, the second ground terminal 222 may be bent at one end of the second ground terminal 222 and extended toward the first surface of the mid plate 210 to come into contact with the mid plate 210. The second ground terminal 222 may also include regions having shapes corresponding to the bending region 2213 and the contact region 2214 of the first ground terminal 221.

With reference to FIG. 3, the third ground terminal 223 may be bent in the bending region 2233 of the third ground terminal 223 and extended toward the second surface of the mid plate 210 (e.g., surface of the mid plate 210 facing at right angles to the negative z-axis direction) to come into contact with the mid plate 210.

In various embodiments, the third ground terminal 223 may include a bending region 2233 and/or a contact region 2234.

In various embodiments, the bending region 2233 of the third ground terminal 223 may be a region that is connected to the first region 2231 located at one end of the third ground terminal 223 and is extended in the height direction (e.g., z-axis direction) of the connector 200. For example, the third ground terminal 223 may be extended in the length direction of the connector 200 in the first region 2231 located at one end of the third ground terminal 223 and then be bent in the height direction of the connector 200 to be connected to the bending region 2233.

In various embodiments, the contact region 2234 of the third ground terminal 223 may refer, for example, to a region that is connected to the bending region 2233 and is extended in the length direction (e.g., y-axis direction) of the connector 200. For example, the third ground terminal 223 may be extended in the height direction of the connector 200 in the bending region 2233 and then be bent in the length direction of the connector 200 to be connected to the contact region 2234.

In various embodiments, the third ground terminal 223 may be in contact with the second surface of the mid plate 210 in the contact region 2234.

In various embodiments, the contact region 2234 of the third ground terminal 223 may be a region extending from the bending region 2233 toward the positive y-axis direction. The extension length of the contact region 2234 may be formed to be about 1 mm or more.

FIG. 3 shows the third ground terminal 223, but the configuration in which the fourth ground terminal 224 (see FIG. 2) contacts the mid plate 210 may also be formed in the same way as the third ground terminal 223. For example, the fourth ground terminal 224 may be bent at one end of the fourth ground terminal 224 and extended toward the second surface of the mid plate 210 to come into contact with the mid plate 210. The fourth ground terminal 224 may also include regions having shapes corresponding to the bending region 2233 and the contact region 2234 of the third ground terminal 223.

In various embodiments, the ground terminal 221 or 223 may be electrically connected to a printed circuit board (not shown) in the second region 2212 or 2232 located at the other end of the ground terminal 221 or 223.

In various embodiments, the ground terminal 221 or 223 may be disposed to penetrate at least a portion of the insulating structure 250. For example, the bending region 2213 or 2233 of the ground terminal 221 or 223 may be extended to penetrate at least a portion of the insulating structure 250.

In various embodiments, the shell 260 may include a coupling region 261. The coupling region 261 may be formed to protrude from the end of the shell 260 (e.g., end portion located in the positive y-axis direction of the shell 260) in the height direction of the connector 200 (e.g., z-axis direction). The coupling region 261 of the shell 260 may be a region coupled to a portion of a printed circuit board (not shown).

Figure 4:
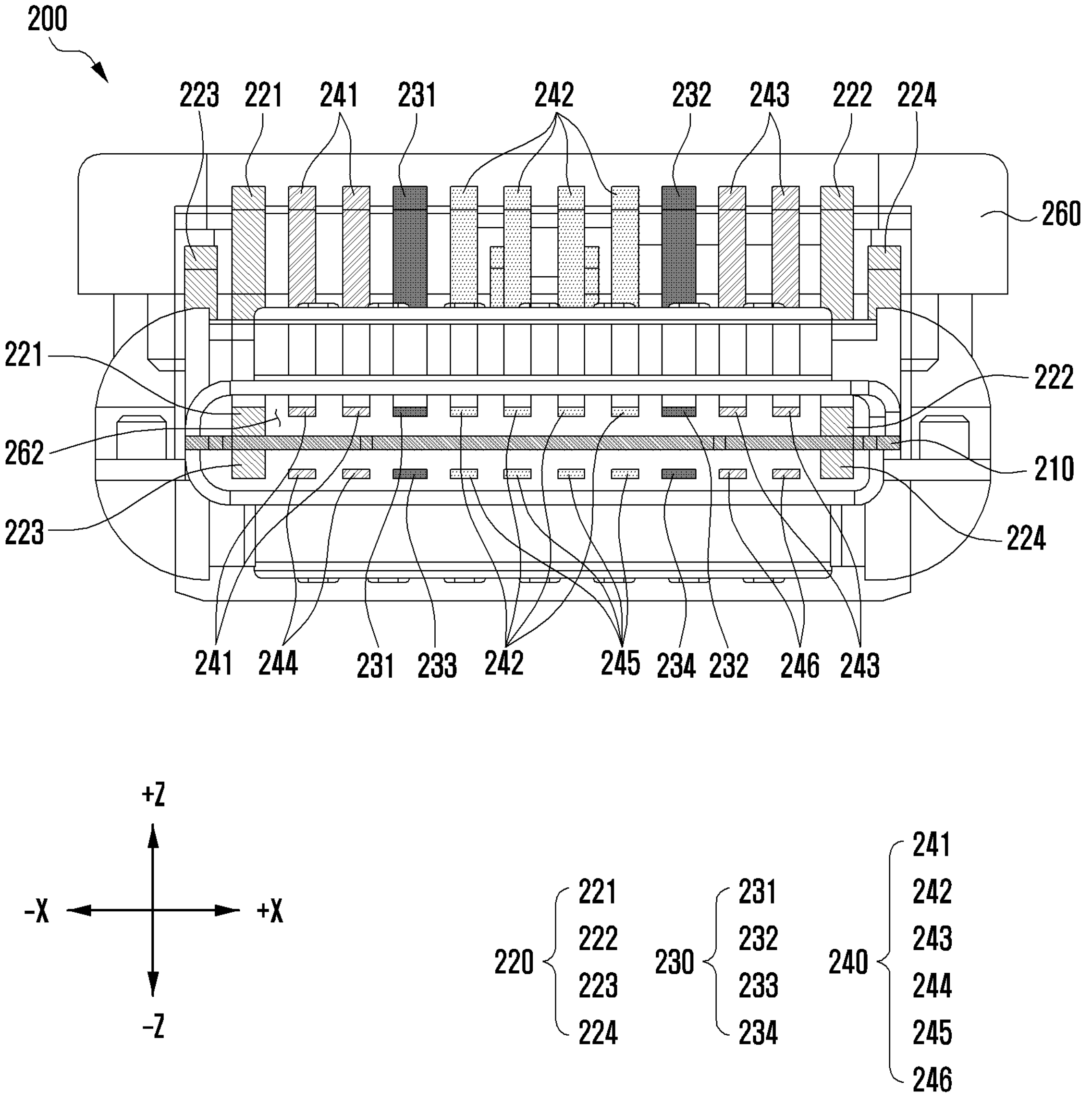
FIG. 4 is a cross-sectional view of the example connector seen from line A-A in FIG. 3 according to various embodiments.

FIG. 4 is a cross-sectional view of the example connector 200 seen from line A-A in FIG. 3 according to various embodiments.

FIG. 4 is a view of the connector 200 excluding the insulating structure 250 shown in FIG. 2.

In various embodiments, the ground terminal 220 may include a first ground terminal 221, a second ground terminal 222, a third ground terminal 223, and/or a fourth ground terminal 224.

In various embodiments, the power terminal 230 may include a first power terminal 231, a second power terminal 232, a third power terminal 233, and/or a fourth power terminal 234.

In various embodiments, the signal terminal 240 may include a first signal terminal 241, a second signal terminal 242, a third signal terminal 243, a fourth signal terminal 244, a fifth signal terminal 245, and/or a sixth signal terminal 246.

In various embodiments, the terminals (e.g., ground terminal 220, power terminal 230, and/or signal terminal 240) may be arranged along the width direction of the connector 200 (e.g., positive x-axis direction). For example, those terminals located in the first direction (e.g., positive z-axis direction) with respect to the mid plate 210 may be arranged along the width direction of the connector 200 in order of first ground terminal 221, first signal terminal 241, first power terminal 231, second signal terminal 242, second power terminal 232, third signal terminal 243, and/or second ground terminal 222. Those terminals located in the second direction (e.g., negative z-axis direction) with respect to the mid plate 210 may be arranged along the width direction of the connector 200 in order of third ground terminal 223, fourth signal terminal 244, third power terminal 233, fifth signal terminal 245, fourth power terminal 234, sixth signal terminal 246, and/or fourth ground terminal 224.

In various embodiments, one side area of the mid plate 210 may refer, for example, to an area of the mid plate 210 that is located in the negative x-axis direction with respect to the width direction (e.g., x-axis direction) midpoint of the mid plate 210 and is located close to the side surface of the mid plate 210 facing the negative x-axis direction.

The other side area of the mid plate 210 may refer to, for example, an area of the mid plate 210 that is located in the positive x-axis direction with respect to the width direction (e.g., x-axis direction) midpoint of the mid plate 210 and is located close to the side surface of the mid plate 210 facing the positive x-axis direction.

In various embodiments, the first ground terminal 221 may be located in the first direction of the one side area of the mid plate 210. The third ground terminal 223 may be located in the second direction of the one side area of the mid plate 210.

In various embodiments, the second ground terminal 222 may be located in the first direction of the other side area of the mid plate 210. The fourth ground terminal 224 may be located in the second direction of the other side area of the mid plate 210.

In various embodiments, the first ground terminal 221, the second ground terminal 222, the third ground terminal 223, and/or the fourth ground terminal 224 may be in contact with the mid plate 210 at least in part.

In various embodiments, at least a portion of the first ground terminal 221 may be disposed on the first surface of the mid plate 210 in the one side area of the mid plate 210 and may come into contact with the mid plate 210.

In various embodiments, at least a portion of the second ground terminal 222 may be disposed on the first surface of the mid plate 210 in the other side area of the mid plate 210 and may come into contact with the mid plate 210.

In various embodiments, at least a portion of the third ground terminal 223 may be disposed on the second surface of the mid plate 210 in the one side area of the mid plate 210 and may come into contact with the mid plate 210.

In various embodiments, at least a portion of the fourth ground terminal 224 may be disposed on the second surface of the mid plate 210 in the other side area of the mid plate 210 and may come into contact with the mid plate 210.

In various embodiments, the power terminal 230 may be disposed to be spaced apart from the mid plate 210. For example, the first power terminal 231 and the second power terminal 232 may be disposed to be spaced apart from the mid plate 210 in the first direction with respect to the mid plate 210. The third power terminal 233 and the fourth power terminal 234 may be disposed to be spaced apart from the mid plate 210 in the second direction with respect to the mid plate 210.

In various embodiments, the signal terminal 240 may be disposed to be spaced apart from the mid plate 210. For example, the first signal terminal 241, the second signal terminal 242, and the third signal terminal 243 may be disposed to be spaced apart from the mid plate 210 in the first direction with respect to the mid plate 210. The fourth signal terminal 244, the fifth signal terminal 245, and the sixth signal terminal 246 may be disposed to be spaced apart from the mid plate 210 in the second direction with respect to the mid plate 210.

In various embodiments, the shell 260 may have a shape surrounding the outer periphery of the mid plate 210, ground terminal 220, power terminal 230, and/or signal terminal 240 at least in part. For example, the shell 260 may have an accommodation space 262 formed as an empty space therein. The mid plate 210, the ground terminal 220, the power terminal 230 and/or the signal terminal 240 may be arranged in the accommodation space 262 of the shell 260.

In various embodiments, the ground terminal 220 and the mid plate 210 may contact each other at least in part to form a path through which a current can flow. For example, a current path involving the first ground terminal 221, the one side area of the mid plate 210, and the third ground terminal 223 may be formed. A current path involving the second ground terminal 222, the other side area of the mid plate 210, and the fourth ground terminal 224 may be formed.

Figure 5:
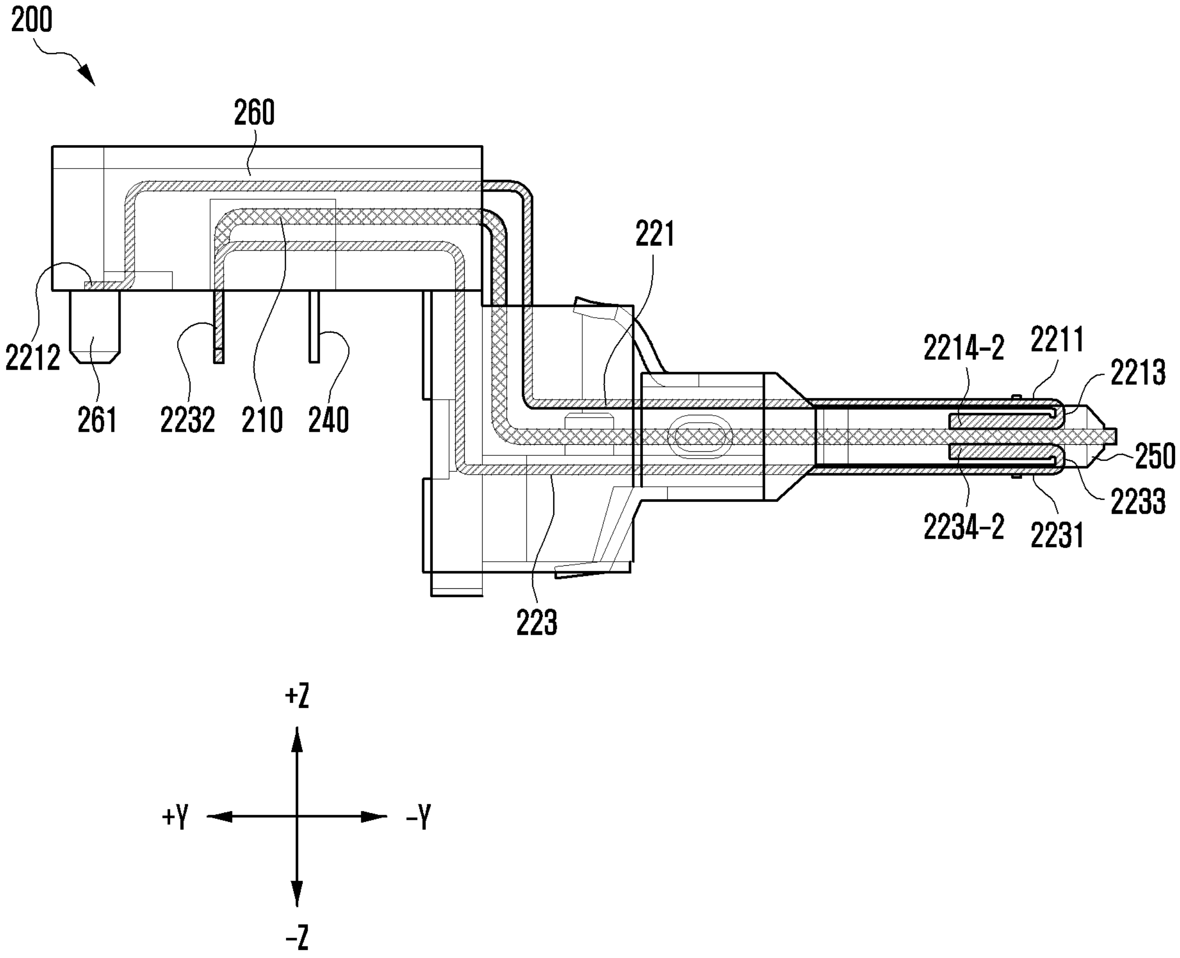
FIG. 5 is a view of an example connector including a contact region according to various embodiments.

FIG. 5 is a view of an example connector 200 including a contact region 2214-2 or 2234-2 according to various embodiments.

In an embodiment, the thicknesses of the contact region 2214-2 or 2234-2 included in the first ground terminal 221 or third ground terminal 223 may be formed to be thicker than other regions of the first ground terminal 221 or third ground terminal 223. For example, with reference to FIG. 5, the contact region 2214-2 of the first ground terminal 221 may be formed to be thicker than the first region 2211 and bending region 2213 of the first ground terminal 221. The contact region 2234-2 of the third ground terminal 223 may be formed to be thicker than the first region 2231 and bending region 2233 of the third ground terminal 223.

FIG. 5 shows the first ground terminal 221 and the third ground terminal 223, but the shapes of the second ground terminal 222 (see FIG. 4) and the fourth ground terminal 224 (see FIG. 4) may be the same as those of the first ground terminal 221 and the third ground terminal 223. For example, in an embodiment, the thicknesses of the contact region of the second ground terminal 222 or fourth ground terminal 224 may be formed to be thicker than other regions of the second ground terminal 222 or fourth ground terminal 224.

In an embodiment, when the thickness of the contact region (e.g., 2214-2 or 2234-2) of the ground terminal 220 is formed to be thicker than other regions (e.g., 2211 or 2231) of the ground terminal 220, the area where the ground terminal 220 contacts the outside at one end of the ground terminal 220 may be increased. When the area of the ground terminal 220 in contact with the outside is increased, because heat dissipation of the connector 200 is improved, the heat generated in the connector 200 and the electronic device 101 including the connector 200 can be reduced.

Figure 6:
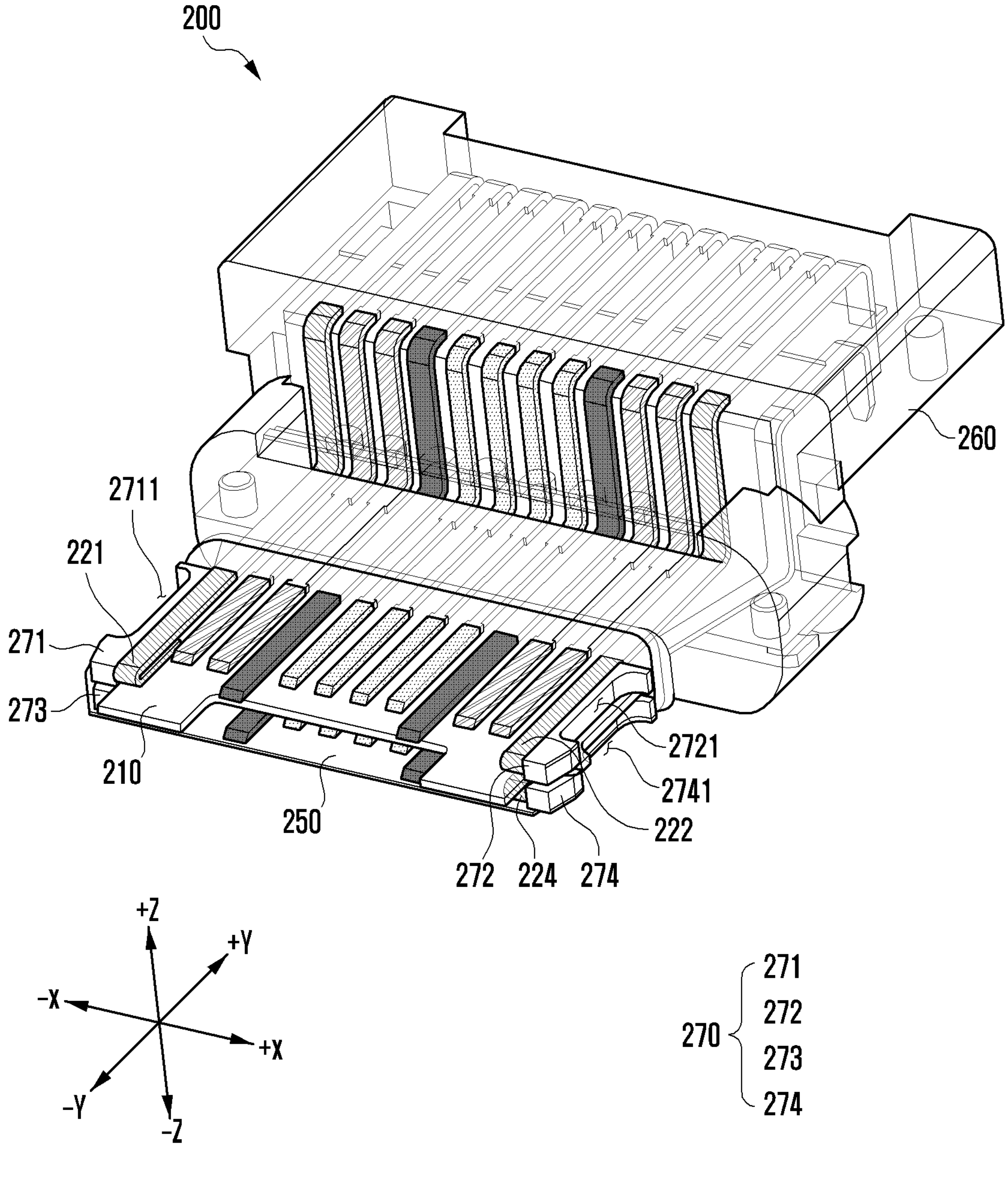
FIG. 6 is a view of an example connector including a blocking member according to various embodiments.

FIG. 6 is a view of an example connector 200 including a blocking member 270 according to various embodiments.

In an embodiment, the connector 200 may include a blocking member 270 at least in part. In an embodiment, the blocking member 270 may include, for example, a silver (Ag) material.

In an embodiment, the blocking member 270 may include a first blocking member 271, a second blocking member 272, a third blocking member 273, and/or a fourth blocking member 274.

In an embodiment, the first blocking member 271 may be disposed on the first surface of the mid plate 210 in the one side area of the mid plate 210. At least a portion of the first blocking member 271 may come into contact with the first ground terminal 221 and the mid plate 210. For example, the first blocking member 271 may be disposed in the negative x-axis direction of the first ground terminal 221 and on the first surface of the mid plate 210 to come into contact with the first ground terminal 221 and the one side area of the mid plate 210.

In an embodiment, the second blocking member 272 may be disposed on the first surface of the mid plate 210 in the other side area of the mid plate 210. At least a portion of the second blocking member 272 may come into contact with the second ground terminal 222 and the mid plate 210. For example, the second blocking member 272 may be disposed in the positive x-axis direction of the second ground terminal 222 and on the first surface of the mid plate 210 to come into contact with the second ground terminal 222 and the other side area of the mid plate 210.

In an embodiment, the third blocking member 273 may be disposed on the second surface of the mid plate 210 in the one side area of the mid plate 210. At least a portion of the third blocking member 273 may come into contact with the third ground terminal 223 (see FIG. 4) and the mid plate 210. For example, the third blocking member 273 may be disposed in the negative x-axis direction of the third ground terminal 223 (see FIG. 4) and on the second surface of the mid plate 210 to come into contact with the third ground terminal 223 (see FIG. 4) and the one side area of the mid plate 210.

In an embodiment, the fourth blocking member 274 may be disposed on the second surface of the mid plate 210 in the other side area of the mid plate 210. At least a portion of the fourth blocking member 274 may come into contact with the fourth ground terminal 224 and the mid plate 210. For example, the fourth blocking member 274 may be disposed in the positive x-axis direction of the fourth ground terminal 224 and on the second surface of the mid plate 210 to come into contact with the fourth ground terminal 224 and the other side area of the mid plate 210.

In an embodiment, the first blocking member 271, the second blocking member 272, the third blocking member 273, and the fourth blocking member 274 may each include a concave region (e.g., 2711 or 2721). For example, at least a portion of the first blocking member 271 may include a concave region 2711 formed in a shape recessed toward the first ground terminal 221. At least a portion of the second blocking member 272 may include a concave region 2721 formed in a shape recessed toward the second ground terminal 222. At least a portion of the third blocking member 273 may include a concave region (not shown) formed in a shape recessed toward the third ground terminal 223 (see FIG. 4). At least a portion of the fourth blocking member 274 may include a concave region 2741 formed in a shape recessed toward the fourth ground terminal 224.

In an embodiment, the concave region (e.g., 2711 or 2721) of the blocking member 270 may be a region to which at least a portion of a plug connector (not shown) located outside the connector 200 is coupled. At least some of the plug connector (not shown) may include a portion formed to protrude in correspondence to the concave region (e.g., 2711 or 2721). When the connector 200 according to an embodiment of the disclosure and the plug connector (not shown) are coupled, the protruding portion of the plug connector (not shown) may be placed (received) in the concave region (e.g., 2711 or 2721) of the blocking member 270.

When the connector 200 according to an embodiment includes the blocking member 270, noise emitted to the outside from the connector 200 can be reduced in comparison to a case in which the blocking member 270 is not included.

Figure 7A:
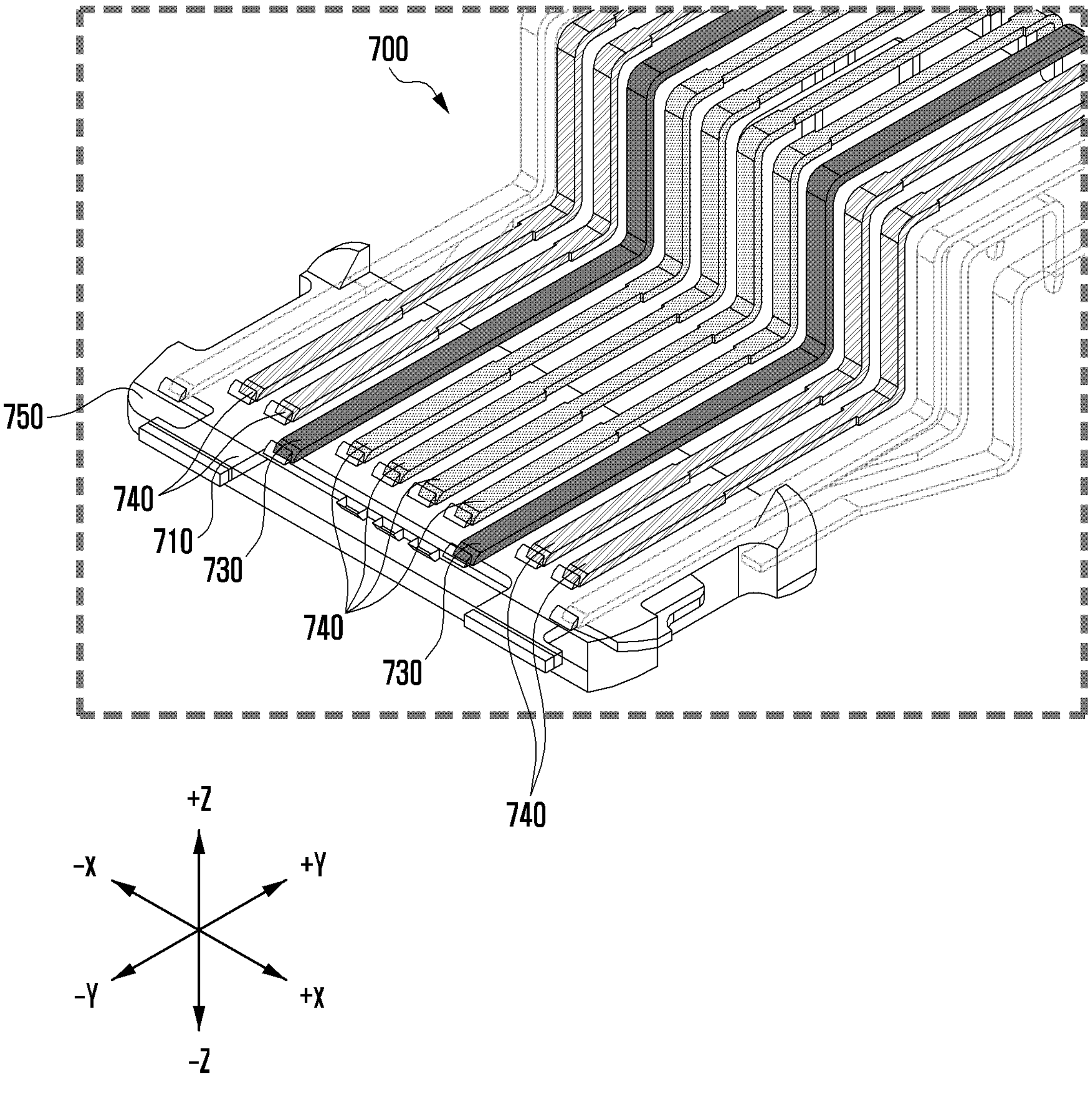
FIGS. 7A and 7B are views of an example connector including a ground terminal according to various embodiments.
Figure 7B:
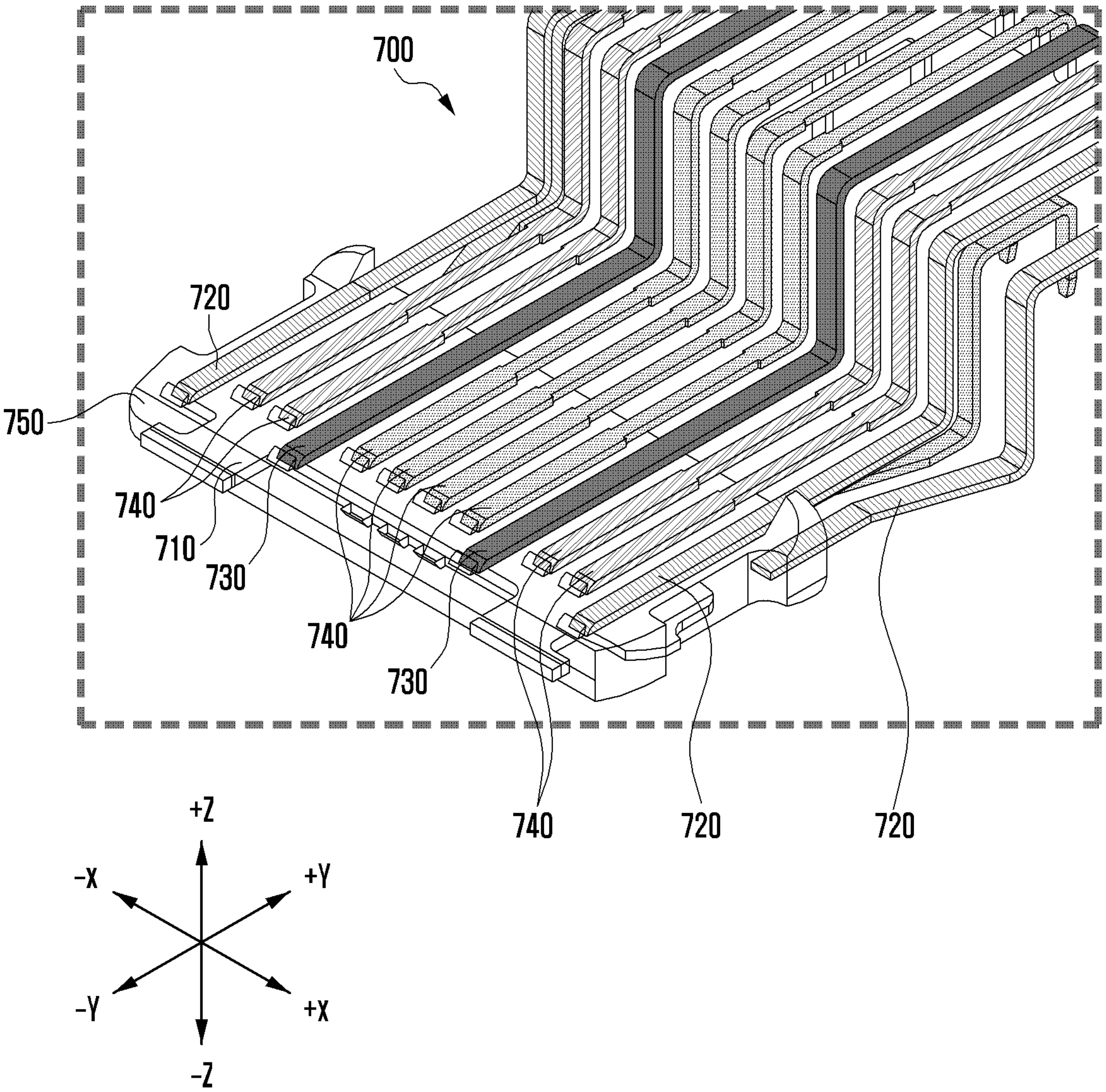

FIGS. 7A and 7B are views of an example connector 700 including a ground terminal 720 according to various embodiments.

With reference to FIG. 7A, when manufacturing the connector 700 including the ground terminal 720 according to an embodiment of the disclosure, the power terminal 730 and the signal terminal 740 excluding the ground terminal 720 may be formed first. For example, the power terminal 730 and the signal terminal 740 including a copper (Cu) material may be formed on one surface of the insulating structure 750.

In an embodiment, the first surface of the mid plate 710 may refer to, for example, a surface of the mid plate 710 facing at right angles to the positive z-axis direction. The second surface of the mid plate 710 may refer to, for example, a surface of the mid plate 710 facing at right angles to the negative z-axis direction.

With reference to FIG. 7B, in an embodiment, the ground terminal 720 may be formed by using a printing technique. After the power terminal 730 and the signal terminal 740 are manufactured, the ground terminal 720 may be formed using a printing technique. For example, the ground terminal 720 may be formed on the first surface of the mid plate 710 and the second surface of the mid plate 710 using a printing technique.

In an embodiment, the ground terminal 720 formed using the printing technique may be electrically connected to at least a portion of the mid plate 710 with a direct contact.

In an embodiment, the ground terminal 720 formed using the printing technique may include, for example, a silver (Ag) material.

In an embodiment, a plurality of ground terminals 720 may be formed on the first surface of the mid plate 710 and the second surface of the mid plate 710. For example, the ground terminals 720 may be disposed respectively in the one side area and the other side area on the first surface of the mid plate 710. The ground terminals 720 may also be disposed respectively in the one side area and the other side area on the second surface of the mid plate 710.

In an embodiment, when the ground terminal 720 is formed on one surface (e.g., first surface or second surface) of the mid plate 710 using a printing technique, as the ground terminal 720 and the mid plate 710 are in direct contact, a separate bonding process (e.g., tape and/or welding) may be not required.

When the ground terminal 720 is formed on one surface of the mid plate 710 using a printing technique as in the embodiment shown in FIG. 7B, the ground terminal 720 and the mid plate 710 may more firmly contact each other compared with a case in which the ground terminal 220 comes into contact with the mid plate 210 in the contact region (e.g., 2214 or 2234) as in the embodiment shown in FIG. 3.

Figure 8A:
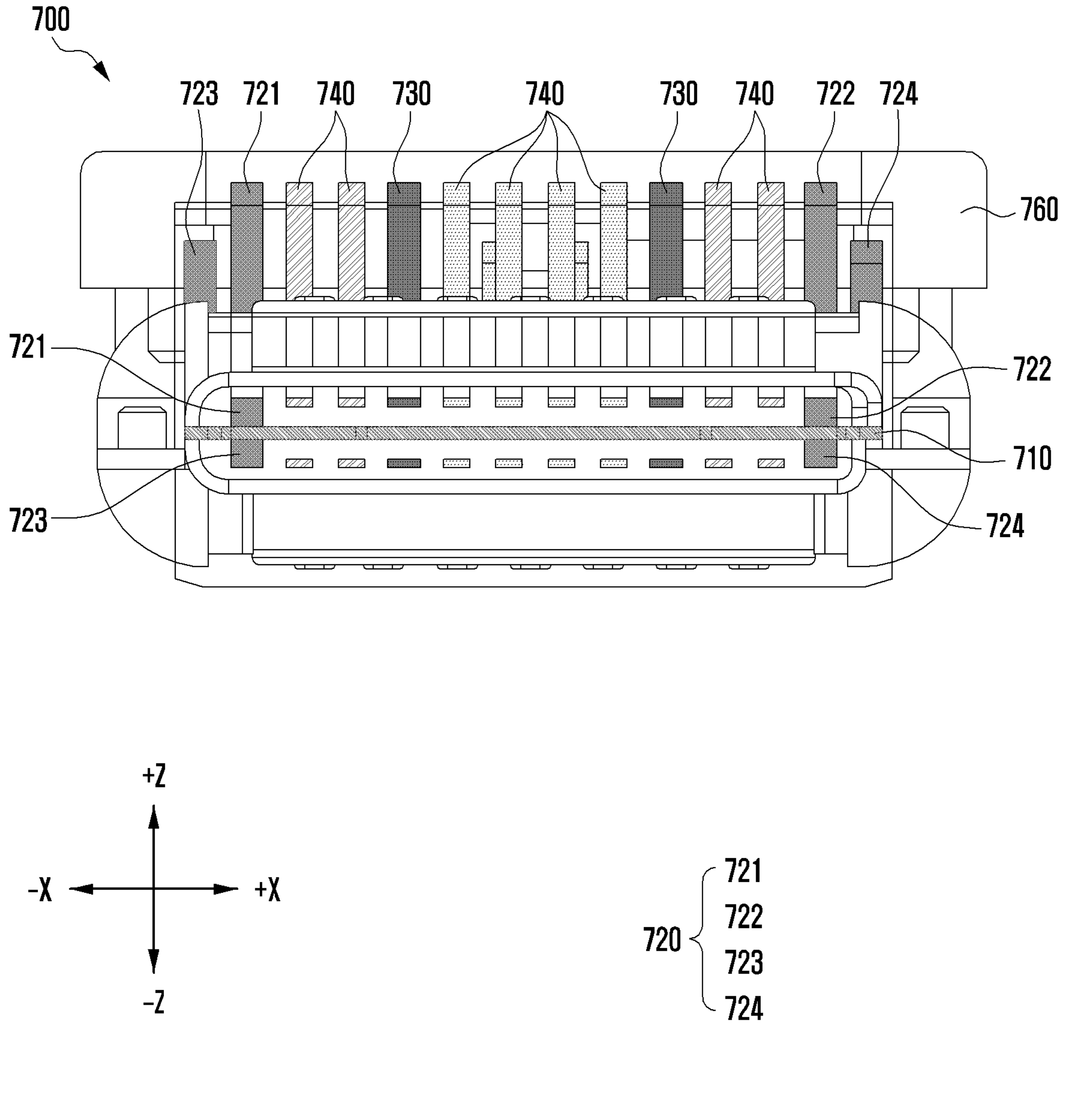
FIGS. 8A, 8B and 8C are views of an example connector according to various embodiments.
Figure 8B:
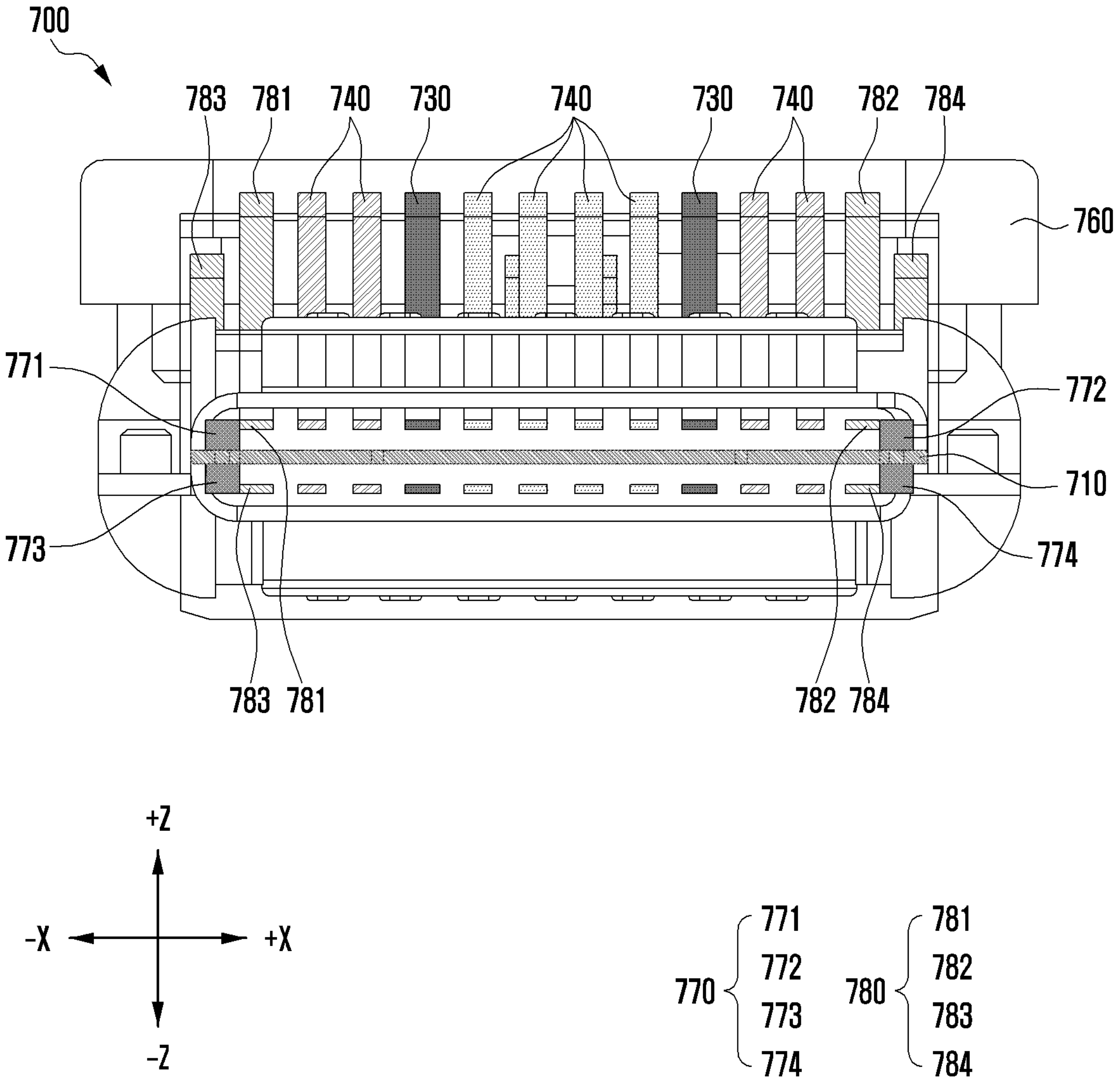
Figure 8C:
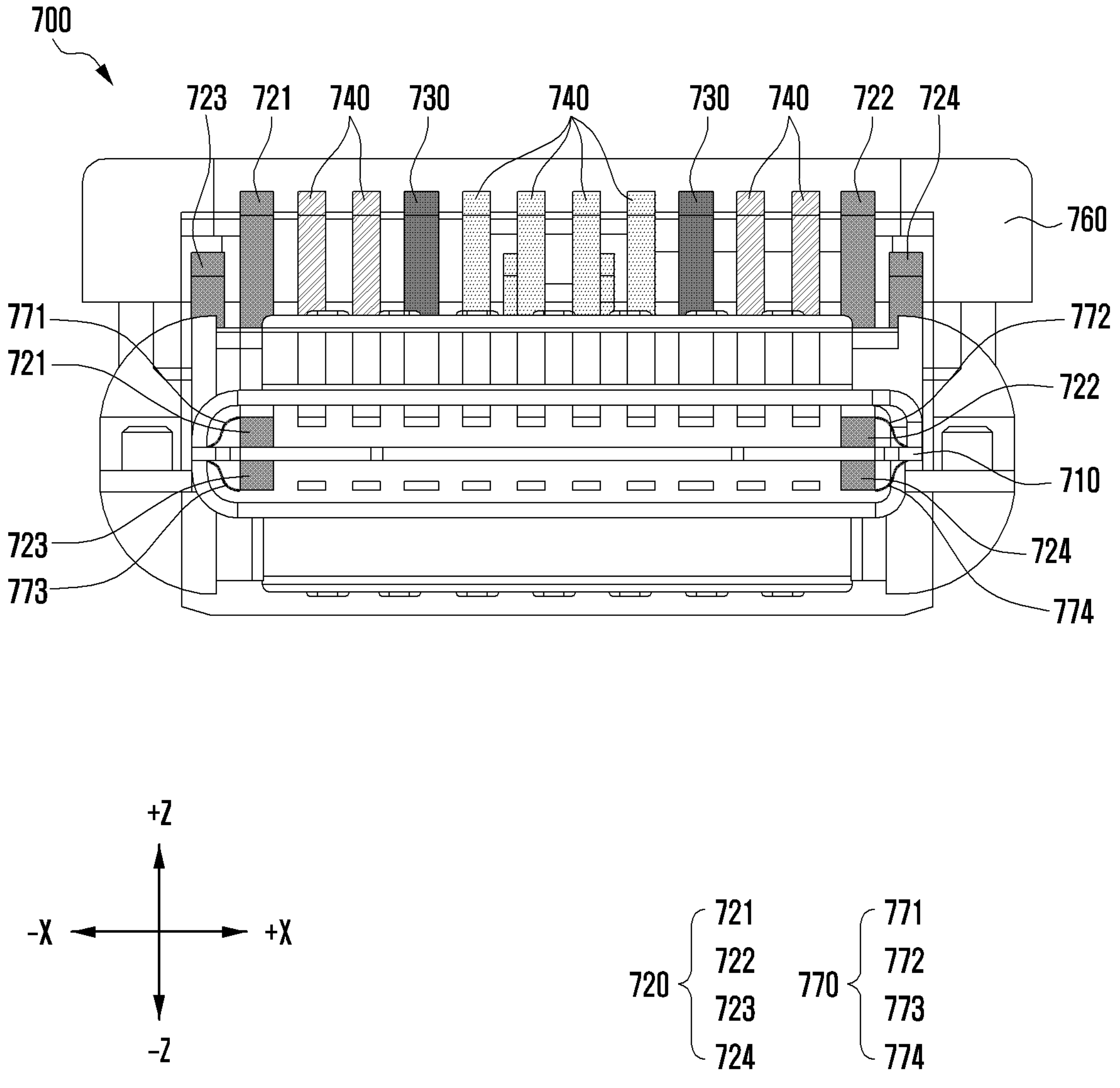

FIGS. 8A, 8B and 8C are views of an example connector 700 according to various embodiments.

FIG. 8A is a view of the example connector 700 including a ground terminal 720 formed using a printing technique.

FIG. 8A is a view showing a state in which the connector 700 (including a shell 760) of FIG. 7B is seen from one direction (e.g., positive y-axis direction in FIG. 7B).

In an embodiment, an opening (not shown) may be formed in at least some of the insulating structure 750 (see FIG. 7B). At least some of the mid plate 710 may be exposed to the outside through the opening (not shown) of the insulating structure 750 (see FIG. 7B). The ground terminal 720 may be formed on one surface of the mid plate 710 exposed through the opening (not shown) of the insulating structure 750 (see FIG. 7B) using a printing technique.

In an embodiment, the ground terminal 720 may include, for example, a silver (Ag) material. In the embodiment shown in FIG. 8A, terminals other than the ground terminal 720 (e.g., power terminal 730, signal terminal 740) may include, for example, a copper (Cu) material.

In an embodiment, the ground terminal 720 may be in contact with at least a portion of the mid plate 710.

In an embodiment, the ground terminal 720 formed using a printing technique may include a first ground terminal 721, a second ground terminal 722, a third ground terminal 723, and/or a fourth ground terminal 724.

In an embodiment, the first ground terminal 721 may be disposed in the one side area on the first surface of the mid plate 710. The second ground terminal 722 may be disposed in the other side area on the first surface of the mid plate 710.

In an embodiment, the third ground terminal 723 may be disposed in the one side area on the second surface of the mid plate 710. The fourth ground terminal 724 may be disposed in the other side area on the second surface of the mid plate 710.

With reference to FIG. 8B, the connector 700 may include a ground terminal 780 and a blocking member 770 according to various embodiments.

In an embodiment, the ground terminal 780 of the connector 700 shown in FIG. 8B may be formed using a printing technique. For example, the ground terminal 780 shown in FIG. 8B may be a ground terminal 780 formed on one surface of the insulating structure 750 (see FIG. 7B) using a printing technique. The ground terminal 780 may be disposed to be spaced apart from the mid plate 710 in the height direction (e.g., z-axis direction) of the connector 700.

In an embodiment, the ground terminal 780 may include, for example, a silver (Ag) material.

In an embodiment, the ground terminal 780 may include a first ground terminal 781, a second ground terminal 782, a third ground terminal 783, and/or a fourth ground terminal 784.

In an embodiment, the first ground terminal 781 may be disposed to be spaced apart in the one side area of the first surface of the mid plate 710 in the first direction of the mid plate 710 (e.g., positive z-axis direction). The second ground terminal 782 may be disposed to be spaced apart in the other side area of the first surface of the mid plate 710 in the first direction of the mid plate 710.

In an embodiment, the third ground terminal 783 may be disposed to be spaced apart in the one side area of the second surface of the mid plate 710 in the second direction of the mid plate 710 (e.g., negative z-axis direction). The fourth ground terminal 784 may be disposed to be spaced apart in the other side area of the second surface of the mid plate 710 in the second direction of the mid plate 710.

In an embodiment, the connector 700 may include a blocking member 770. The blocking member 770 may include a first blocking member 771, a second blocking member 772, a third blocking member 773, and/or a fourth blocking member 774.

In an embodiment, the first blocking member 771 may be disposed in a lateral direction of the first ground terminal 781 (e.g., in negative x-axis direction of the first ground terminal 781) and on the first surface of the mid plate 710. The first blocking member 771 may be in contact with the first ground terminal 781 and at least a portion of the mid plate 710. The second blocking member 772 may be disposed in a lateral direction of the second ground terminal 782 (e.g., in positive x-axis direction of the second ground terminal 782) and on the first surface of the mid plate 710. The second blocking member 772 may be in contact with the second ground terminal 782 and at least a portion of the mid plate 710.

In an embodiment, the third blocking member 773 may be disposed in a lateral direction of the third ground terminal 783 (e.g., in negative x-axis direction of the third ground terminal 783) and on the second surface of the mid plate 710. The third blocking member 773 may be in contact with the third ground terminal 783 and at least a portion of the mid plate 710. The fourth blocking member 774 may be disposed in a lateral direction of the fourth ground terminal 784 (e.g., in positive x-axis direction of the fourth ground terminal 784) and on the second surface of the mid plate 710. The fourth blocking member 774 may be in contact with the fourth ground terminal 784 and at least a portion of the mid plate 710.

In an embodiment, the blocking member 770 may come into contact with the ground terminal 780 and the mid plate 710 to form a current path through which a current flows. For example, a current path in the one side area of the mid plate 710 may be formed to include first ground terminal 781, first blocking member 771, mid plate 710, third blocking member 773, and third ground terminal 783 in that order. A current path in the other side area of the mid plate 710 may be formed to include second ground terminal 782, second blocking member 772, mid plate 710, fourth blocking member 774, and fourth ground terminal 784 in that order.

FIG. 8C is a view of an example connector 700 including a ground terminal 720 and a blocking member 770 formed on one surface of the mid plate 710 using a printing technique according to various embodiments.

The ground terminal 720 shown in FIG. 8C may be a terminal formed in the same manner as the ground terminal 720 shown in FIG. 8A. For example, the ground terminal 720 in FIG. 8C may be a terminal formed using a printing technique on one surface of the mid plate 710 exposed through an opening (not shown) of the insulating structure 750 (see FIG. 7B).

In an embodiment, the ground terminal 720 may include, for example, a silver (Ag) material.

In an embodiment, the connector 700 may include a blocking member 770. The blocking member 770 may include a first blocking member 771, a second blocking member 772, a third blocking member 773, and/or a fourth blocking member 774.

In an embodiment, the blocking member 770 may be in contact with the ground terminal 720 and at least a portion of the mid plate 710. For example, the first blocking member 771 may be in contact with the first ground terminal 721 and the one side area of the mid plate 710. The second blocking member 772 may be in contact with the second ground terminal 722 and the other side area of the mid plate 710. The third blocking member 773 may be in contact with the third ground terminal 723 and the one side area of the mid plate 710. The fourth blocking member 774 may be in contact with the fourth ground terminal 724 and the other side area of the mid plate 710.

In the embodiment of FIG. 8C, the ground terminal 720 and the blocking member 770 may each be in contact with the mid plate 710. In the embodiment of FIG. 8C, as the ground terminal 720 is electrically connected to the mid plate 710 with a direct contact, it may be advantageous to reduce noise emitted from the connector 700 in comparison to the embodiment of FIG. 8B (e.g., the ground terminal 780 is electrically connected to the mid plate 710 indirectly through the blocking member 770).

Figure 9A:
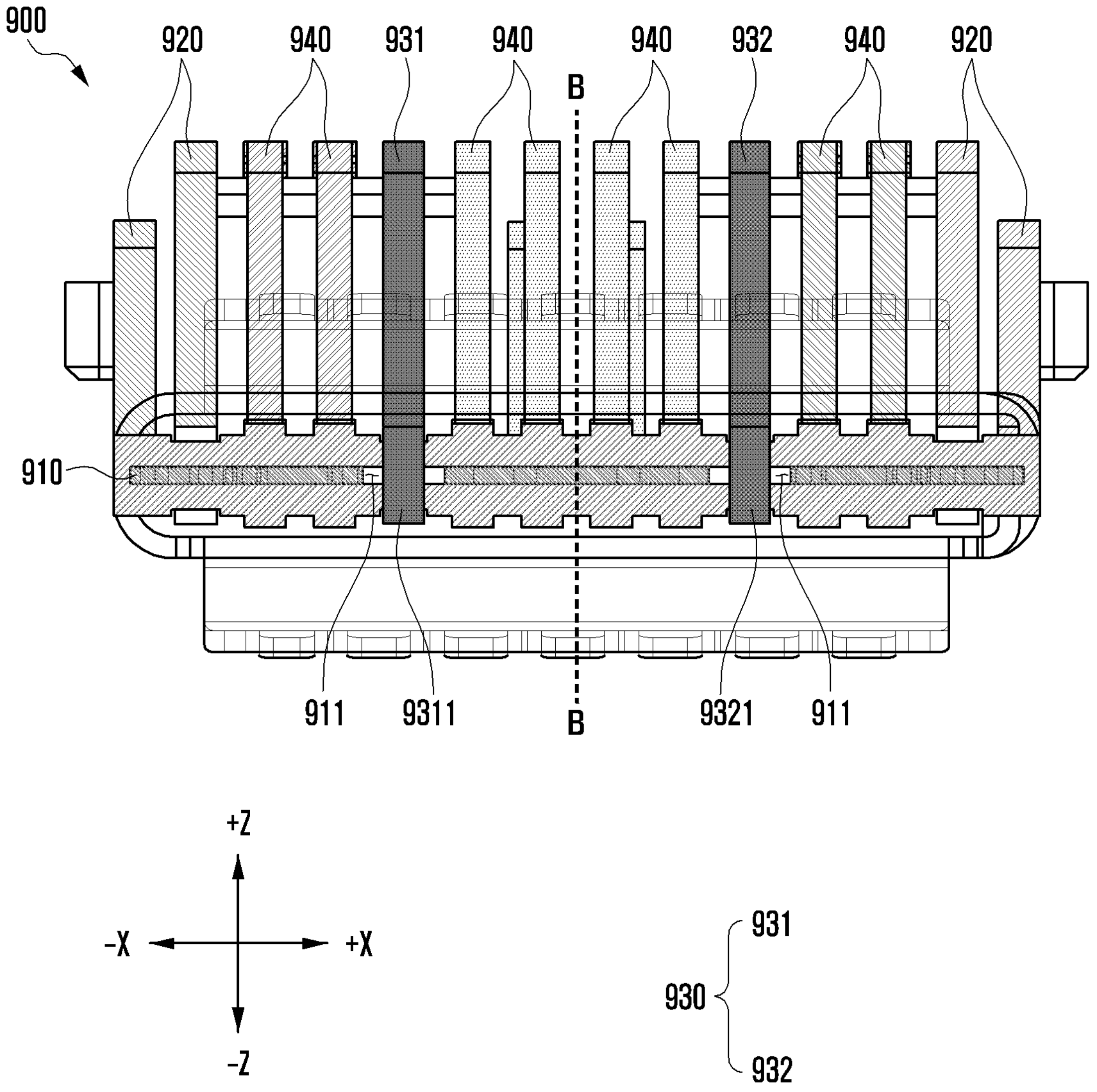
FIGS. 9A, 9B and 9C are views of an example connector including a power terminal according to various embodiments.
Figure 9B:
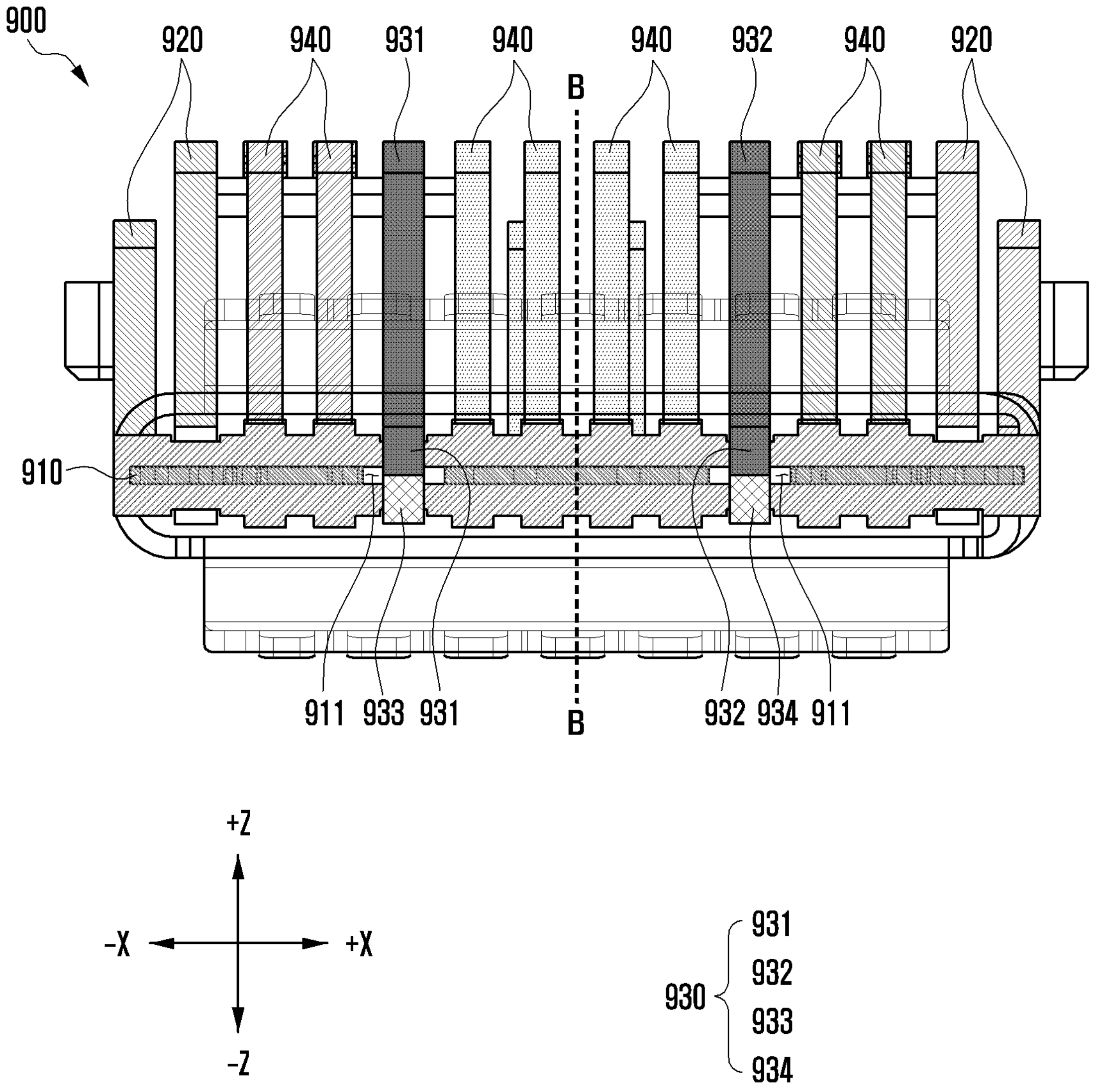
Figure 9C:
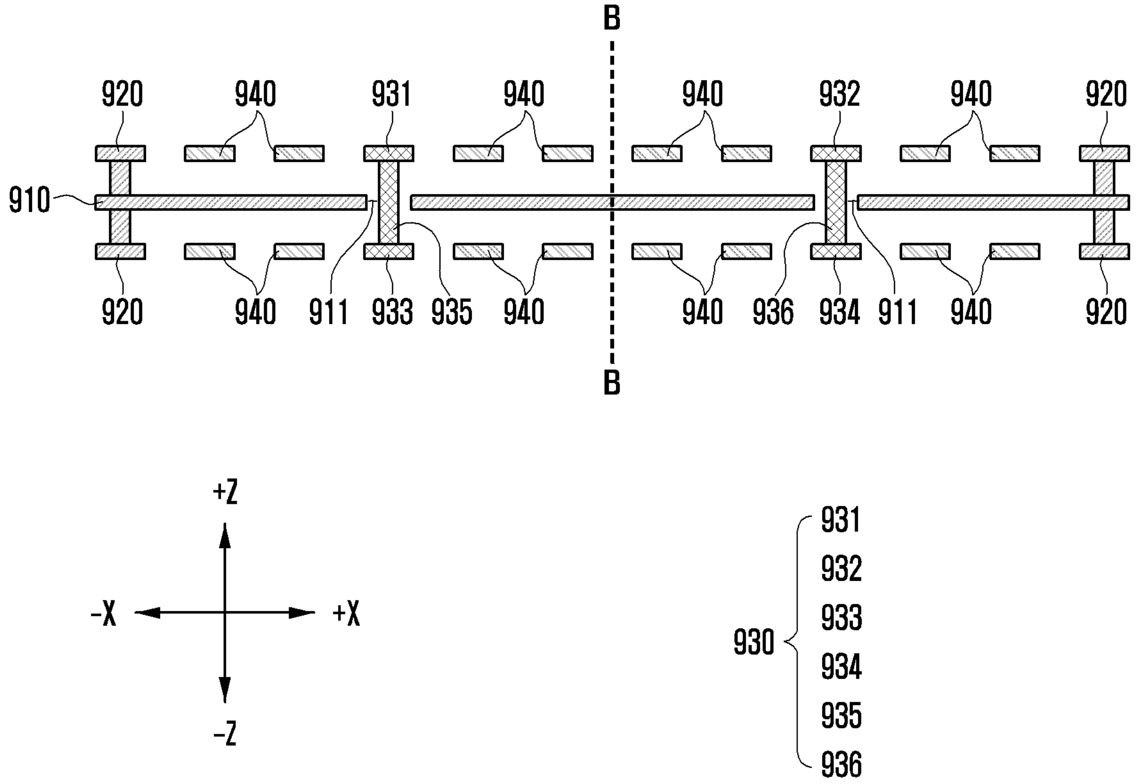

FIGS. 9A, 9B and 9C are views of an example connector 900 including a power terminal 930 according to various embodiments.

The power terminal 930 shown in FIG. 9A, 9B or 9C may be at least partially similar to the power terminal 230 shown in FIG. 2, or may further include other embodiments of the power terminal 230.

In various embodiments, the width direction of the connector 900 may refer to, for example, the x-axis direction, and the height direction of the connector 900 may refer to, for example, the z-axis direction.

FIG. 9A is a view illustrating an example power terminal 930 according to various embodiments.

In various embodiments, the mid plate 910 may include a plate groove 911 at least in part. The plate groove 911 may be formed in a shape in which at least a portion of the mid plate 910 is recessed toward the length direction of the connector 900 (e.g., positive y-axis direction in FIG. 2).

With reference to FIG. 9A, a portion of the power terminal 930 according to an embodiment may be disposed in the first direction of the mid plate 910 (e.g., positive z-axis direction), and the remaining portion of the power terminal 930 may be disposed in the second direction of the mid plate 910 (e.g., negative z-axis direction). The portion of the power terminal 930 disposed in the first direction of the mid plate 910 and the portion of the power terminal 930 disposed in the second direction of the mid plate 910 may be connected to each other.

In an embodiment, the power terminal 930 may include a first power terminal 931 and/or a second power terminal 932. The second power terminal 932 may be disposed at a position symmetrical to the first power terminal 931 with respect to the width direction (e.g., x-axis direction) center line B-B of the connector 900.

In an embodiment, a plurality of signal terminals 940 may be disposed between the first power terminal 931 and the second power terminal 932.

In an embodiment, the ground terminal 920 may be located closer to the one side area or the other side area of the mid plate 910 than other terminals (e.g., power terminal 930, signal terminal 940).

In an embodiment, at least a portion of the first power terminal 931 may be located in the first direction (e.g., positive z-axis direction) with respect to the mid plate 910, and at least a portion of the first power terminal 931 may be located in the second direction (e.g., negative z-axis direction) with respect to the mid plate 910.

In an embodiment, the first power terminal 931 may include a first connection region 9311 extended at least partially through the plate groove 911 of the mid plate 910. The first connection region 9311 may be connected at one end to a portion of the first power terminal 931 located in the first direction of the mid plate 910, and may be connected at the other end to a portion of the first power terminal 931 located in the second direction of the mid plate 910.

In an embodiment, at least a portion of the second power terminal 932 may be located in the first direction (e.g., positive z-axis direction) with respect to the mid plate 910, and at least a portion of the second power terminal 932 may be located in the second direction (e.g., negative z-axis direction) with respect to the mid plate 910.

In an embodiment, the second power terminal 932 may include a second connection region 9321 extended at least partially through the plate groove 911 of the mid plate 910. The second connection region 9321 may be connected at one end to a portion of the second power terminal 932 located in the first direction of the mid plate 910, and may be connected at the other end to a portion of the second power terminal 932 located in the second direction of the mid plate 910.

FIG. 9B is a view illustrating an example power terminal 930 according to various embodiments.

With reference to FIG. 9B, the power terminal 930 may include a first power terminal 931, a second power terminal 932, a third power terminal 933, and/or a fourth power terminal 934.

In an embodiment, the first power terminal 931, the second power terminal 932, the third power terminal 933, and/or the fourth power terminal 934 may be separately manufactured during the manufacturing process and then be disposed at portions of the connector 900.

In an embodiment, the first power terminal 931 and the third power terminal 933 may be disposed at positions symmetrical to the second power terminal 932 and the fourth power terminal 934 with respect to the width direction (e.g., x-axis direction) center line B-B of the connector 900.

In an embodiment, a plurality of signal terminals 940 may be disposed between the first power terminal 931 and the second power terminal 932. A plurality of signal terminals 940 may be disposed between the third power terminal 933 and the fourth power terminal 934.

In an embodiment, the ground terminal 920 may be located closer to the one side area or the other side area of the mid plate 910 than other terminals (e.g., power terminal 930, signal terminal 940).

In an embodiment, the first power terminal 931 may be disposed in the first direction of the mid plate 910 (e.g., positive z-axis direction). The third power terminal 933 may be disposed in the second direction of the mid plate 910 (e.g., negative z-axis direction).

In an embodiment, at least a portion of the power terminal 930 may at one end be extended in the height direction of the connector 900 to be disposed in the plate groove 911.

In an embodiment, at least a portion of the first power terminal 931 may be extended in the height direction of the connector 900 (e.g., z-axis direction) toward the plate groove 911 of the mid plate 910. At least a portion of the third power terminal 933 may also be extended in the height direction of the connector 900 (e.g., z-axis direction) toward the plate groove 911 of the mid plate 910.

With reference to FIG. 9B, the first power terminal 931 may be in contact with the third power terminal 933 at least in part. For example, the first power terminal 931 may come into contact with one end of the third power terminal 933 at one end of the first power terminal 931 located in the plate groove 911 of the mid plate 910.

In an embodiment, the second power terminal 932 may be disposed in the first direction of the mid plate 910 (e.g., positive z-axis direction). The fourth power terminal 934 may be disposed in the second direction of the mid plate 910 (e.g., negative z-axis direction).

In an embodiment, at least a portion of the second power terminal 932 may be extended in the height direction of the connector 900 (e.g., z-axis direction) toward the plate groove 911 of the mid plate 910. At least a portion of the fourth power terminal 934 may also be extended in the height direction of the connector 900 (e.g., z-axis direction) toward the plate groove 911 of the mid plate 910.

With reference to FIG. 9B, the second power terminal 932 may come into contact with the fourth power terminal 934 at least in part. For example, the second power terminal 932 may come into contact with one end of the fourth power terminal 934 at one end of the second power terminal 932 located in the plate groove 911 of the mid plate 910.

FIG. 9C is a view showing a power terminal 930 according to various embodiments.

With reference to FIG. 9C, the power terminal 930 according to an embodiment may include a first power terminal 931, a second power terminal 932, a third power terminal 933, a fourth power terminal 934, a first connection terminal 935, and/or a second connection terminal 936.

In an embodiment, the first power terminal 931, the second power terminal 932, the third power terminal 933, the fourth power terminal 934, the first connection terminal 935, and/or the second connection terminal 936 may be separately manufactured in the manufacturing process and then be arranged at portions of the connector 900.

In an embodiment, a plurality of signal terminals 940 may be disposed between the first power terminal 931 and the second power terminal 932. A plurality of signal terminals 940 may be disposed between the third power terminal 933 and the fourth power terminal 934.

In an embodiment, the ground terminal 920 may be located closer to the one side area or the other side area of the mid plate 910 than other terminals (e.g., power terminal 930, signal terminal 940).

In an embodiment, the first power terminal 931 and the second power terminal 932 may be disposed in the first direction of the mid plate 910. The third power terminal 933 and the fourth power terminal 934 may be disposed in the second direction of the mid plate 210. The first connection terminal 935 and the second connection terminal 936 may be located in the plate groove 911 of the mid plate 910.

In an embodiment, the first connection terminal 935 and the second connection terminal 936 may be extended in the height direction of the connector 900 (e.g., z-axis direction).

In an embodiment, the first connection terminal 935 may be connected to the first power terminal 931 and the third power terminal 933. For example, the first connection terminal 935 may be connected to the first power terminal 931 at one end of the first connection terminal 935 and may be connected to the third power terminal 933 at the other end of the first connection terminal 935.

In an embodiment, the second connection terminal 936 may be connected to the second power terminal 932 and the fourth power terminal 934. For example, the second connection terminal 936 may be connected to the second power terminal 932 at one end of the second connection terminal 936 and may be connected to the fourth power terminal 934 at the other end of the second connection terminal 936.

In various embodiments, embodiments related to the power terminal 930 shown in FIGS. 9A, 9B and 9C may be applied independently of or in combination with embodiments shown in FIGS. 2 and 3.

Figure 10:
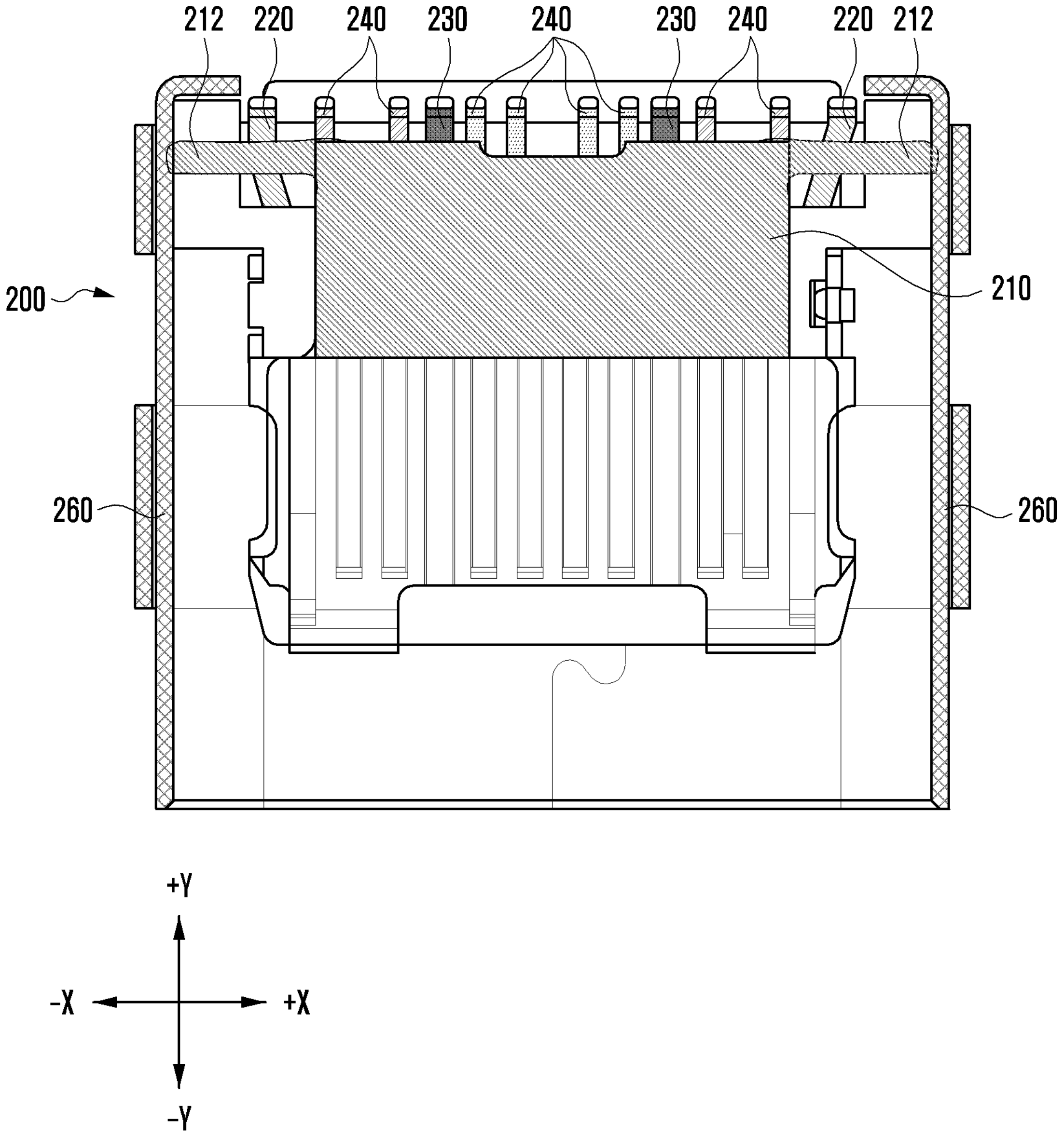
FIG. 10 is a view showing an extension region of the mid plate according to various embodiments.

FIG. 10 is a view showing an extension region 212 of the mid plate 210 according to various embodiments.

FIG. 10 is a view showing a portion of the connector 200 on the x-y plane according to various embodiments.

In an embodiment, the shell 260 may be formed to extend along the circumference of the connector 200. For example, the shell 260 may at least in part be extended along the length direction of the connector 200 (e.g., y-axis direction).

In an embodiment, at least a portion of the mid plate 210 may include an extension region 212 that is extended toward the shell 260 in the width direction of the connector 200 (e.g., x-axis direction). The extension region 212 may be extended along the width direction of the connector 200 (e.g., x-axis direction).

In an embodiment, the extension region 212 of the mid plate 210 may have a preset length in the length direction of the connector 200 (e.g., y-axis direction).

In an embodiment, the mid plate 210 may include two extension regions 212. One extension region 212 may be extended in the negative x-axis direction from one side of the mid plate 210, and the other extension region 212 may be extended in the positive x-axis direction from the other side of the mid plate 210. The mid plate 210 may be in contact with the shell 260 at one end of each of the two extension regions 212.

In an embodiment, as the extension region 212 of the mid plate 210 comes into contact with the shell 260, signal integrity (SI) of the connector 200 can be improved and noise emission of the connector 200 can be reduced. In addition, as the extension region 212 of the mid plate 210 comes into contact with the shell 260, electro static discharge (ESD) or electrical overstress (EOS) can be reduced.

An electronic device 101 including a connector 200 according to an embodiment of the present disclosure may include the connector 200 and a printed circuit board electrically connected to the connector.

The connector 200 according to an example embodiment may include a mid plate 210 that includes a first surface and a second surface opposite to the first surface, a plurality of terminals 220 and 230, and an insulating structure 250 in which at least a part of the mid plate is disposed and supporting at least some of the plural terminals, wherein the plurality of terminals may include a ground terminal 220 that is disposed at least partially spaced apart in a first direction or in a second direction opposite to the first direction with respect to the mid plate, is extended in a length direction of the connector, and is in contact with the mid plate at one end and is in contact with the printed circuit board at the other end, wherein the ground terminal disposed in the first direction with respect to the mid plate may be bent at one end of the ground terminal in a direction toward the first surface of the mid plate and extended to contact the first surface of the mid plate, wherein the ground terminal disposed in the second direction with respect to the mid plate may be bent at one end of the ground terminal in a direction toward the second surface of the mid plate and extended to contact the second surface of the mid plate.

In an example embodiment, the ground terminal may include a first ground terminal 221 located in the first direction of one side area of the mid plate, a second ground terminal 222 located in the first direction of the other side area of the mid plate, a third ground terminal 223 located in the second direction of the one side area of the mid plate, and a fourth ground terminal 224 located in the second direction of the other side area of the mid plate.

In an example embodiment, the first ground terminal or the second ground terminal may be bent at at least a portion of one end in a direction toward the first surface of the mid plate and extended to contact the first surface of the mid plate; the third ground terminal or the fourth ground terminal may be bent at at least a portion of one end in a direction toward the second surface of the mid plate and extended to contact the second surface of the mid plate.

In an example embodiment, the ground terminal may include a bending region 2213 that is extended from one end of the ground terminal in a height direction of the connector, and a contact region 2214 that is connected to the bending region, is extended in a length direction of the connector, and is in contact with the mid plate.

In an example embodiment, the contact region may be formed to be thicker than the bending region.

In an example embodiment, the connector may include a blocking member 270 in contact with at least a portion of the mid plate, wherein the blocking member may include a first blocking member 271 in contact with one side area of the mid plate and the first ground terminal, a second blocking member 272 in contact with the other side area of the mid plate and the second ground terminal, a third blocking member 273 in contact with the one side area of the mid plate and the third ground terminal, and a fourth blocking member 274 in contact with the other side area of the mid plate and the fourth ground terminal.

In an example embodiment, each of the first blocking member, the second blocking member, the third blocking member, and the fourth blocking member may include a concave region (e.g., 2711, 2721) formed in a shape recessed toward the ground terminal at least in part.

In an example embodiment, the blocking member may include a silver (Ag) material.

In an example embodiment, at least a portion of the ground terminal may be formed on the first surface of the mid plate or the second surface of the mid plate using a printing technique.

In an example embodiment, the ground terminal may include a silver (Ag) material.

In an example embodiment, the electronic device 101 may further include a power terminal 230 and a signal terminal 240 for transmitting and receiving an electrical signal, wherein the power terminal may include a first power terminal 231, a second power terminal 232, a third power terminal 233, and a fourth power terminal 234, wherein the signal terminal may include a first signal terminal 241, a second signal terminal 242, a third signal terminal 243, a fourth signal terminal 244, a fifth signal terminal 245, and a sixth signal terminal 246.

In an example embodiment, the first ground terminal, the first signal terminal, the first power terminal, the second signal terminal, the second power terminal, the third signal terminal, and the second ground terminal may be arranged in that order in the first direction with respect to the mid plate along the width direction of the connector.

In an example embodiment, the third ground terminal, the fourth signal terminal, the third power terminal, the fifth signal terminal, the fourth power terminal, the sixth signal terminal, and the fourth ground terminal may be arranged in that order in the second direction with respect to the mid plate along the width direction of the connector.

In an example embodiment, the mid plate may at least in part include a plate groove 211 formed in a shape recessed toward the length direction of the connector.

In an example embodiment, the power terminal may include a first power terminal 931 that includes a first connection region 9311 passing through the plate groove 911 and extended in the height direction of the connector, and a second power terminal 932 that is disposed at a position symmetrical to the first power terminal with respect to the width direction center line of the connector and includes a second connection region 9321 passing through the plate groove and extended in the height direction of the connector.

In an example embodiment, at least a portion of one end of the power terminal 930 may be extended in the height direction of the connector and be disposed in the plate groove 911.

In an example embodiment, the power terminal 930 may include a first power terminal 931 disposed in the first direction of the mid plate, a second power terminal 932 disposed in the first direction of the mid plate and disposed symmetrically with the first power terminal with respect to the width direction center line of the connector, a third power terminal 933 disposed in the second direction of the mid plate and having one end in contact with one end of the first power terminal located in the plate groove, and a fourth power terminal 934 disposed in the second direction of the mid plate, disposed symmetrically with the third power terminal with respect to the width direction center line of the connector, and having one end in contact with one end of the second power terminal located in the plate groove.

In an example embodiment, the power terminal 930 may include a first power terminal 931 disposed in the first direction of the mid plate, a second power terminal 932 disposed in the first direction of the mid plate and disposed symmetrically with the first power terminal with respect to the width direction center line of the connector, a third power terminal 933 disposed in the second direction of the mid plate, a fourth power terminal 934 disposed in the second direction of the mid plate and disposed symmetrically with the third power terminal with respect to the width direction center line of the connector, a first connection terminal 935 located in the plate groove, connected to the first power terminal at one end, and connected to the third power terminal at the other end, and a second connection terminal 936 located in the plate groove, connected to the second power terminal at one end, and connected to the fourth power terminal at the other end.

In an example embodiment, the electronic device 101 may further include a shell 260 that is disposed to surround at least some of the mid plate, the insulating structure, and the plurality of terminals.

In an example embodiment, the mid plate may at least in part include an extension region 212 that is extended in the width direction of the connector toward the shell and is in contact with the shell.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C” may include any one of, or all possible combinations of the items enumerated together in a corresponding one of the phrases. As used herein, such terms as “1st” and “2nd”, or “first” and “second” may be used to simply distinguish a corresponding component from another, and do not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), the element may be coupled with the other element directly (e.g., wiredly), wirelessly, or via a third element.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a connector; and a printed circuit board electrically connected to the connector, wherein the connector includes:

a mid plate that includes a first surface and a second surface opposite to the first surface;

a plurality of terminals; and an insulating structure in which at least a part of the mid plate is disposed and supporting at least some of the plurality of terminals, wherein the plurality of terminals include a first ground terminal disposed to be spaced apart at least in part in a first direction with respect to the first surface of the mid plate, a second ground terminal disposed to be spaced apart at least in part in the first direction with respect to the first surface of the mid plate and to be spaced apart from the first ground terminal, a third ground terminal disposed to be spaced apart at least in part in a second direction opposite to the first direction with respect to the second surface of the mid plate, and a fourth ground terminal disposed to be spaced apart at least in part in the second direction with respect to the second surface of the mid plate and to be spaced apart from the third ground terminal, wherein each of the first, second, third and fourth ground terminals is bent at a portion of one end in a direction toward the mid plate and extended from the portion to contact the mid plate, and wherein each of the first, second, third and fourth ground terminals is extended in a length direction of the connector to contact with the printed circuit board at the other end.

2. The electronic device of claim 1, wherein:

each of the first ground terminal and the second ground terminal is bent at the portion of the one end in a direction toward the first surface of the mid plate and extended from the portion to come into contact with the first surface of the mid plate; and each of the third ground terminal and the fourth ground terminal is bent at the portion of the one end in a direction toward the second surface of the mid plate and extended from the portion to come into contact with the second surface of the mid plate.

3. The electronic device of claim 2, wherein:

the connector includes a blocking member in contact with at least a portion of the mid plate; and the blocking member includes a first blocking member in contact with the first surface of the mid plate and the first ground terminal, a second blocking member in contact with the first surface of the mid plate and the second ground terminal, a third blocking member in contact with the second surface of the mid plate and the third ground terminal, and a fourth blocking member in contact with the second surface of the mid plate and the fourth ground terminal.

4. The electronic device of claim 3, wherein the first blocking member includes a first concave region formed in a shape recessed toward the first ground terminal, wherein the second blocking member includes a second concave region formed in a shape recessed toward the second ground terminal, wherein the third blocking member includes a third concave region formed in a shape recessed toward the third ground terminal, and wherein the fourth blocking member includes a fourth concave region formed in a shape recessed toward the fourth ground terminal.

5. The electronic device of claim 3, wherein the blocking member includes a silver (Ag) material.

6. The electronic device of claim 2, further comprising a power terminal and a signal terminal for transmitting and receiving an electrical signal, wherein the power terminal includes a first power terminal, a second power terminal, a third power terminal, and a fourth power terminal, wherein the signal terminal includes a first signal terminal, a second signal terminal, a third signal terminal, a fourth signal terminal, a fifth signal terminal, and a sixth signal terminal, wherein the first ground terminal, the first signal terminal, the first power terminal, the second signal terminal, the second power terminal, the third signal terminal, and the second ground terminal are arranged in that order in the first direction with respect to the first surface of the mid plate along a width direction of the connector, and wherein the third ground terminal, the fourth signal terminal, the third power terminal, the fifth signal terminal, the fourth power terminal, the sixth signal terminal, and the fourth ground terminal are arranged in that order in the second direction with respect to the second surface of the mid plate along the width direction of the connector.

7. The electronic device of claim 1, wherein each of the first, second, third and fourth ground terminals includes a bending region at the portion of the one end, bending region being extended in a height direction of the connector, and a contact region that is connected to the bending region, is extended in the length direction of the connector, and is in contact with the mid plate.

8. The electronic device of claim 7, wherein the contact region is thicker than the bending region.

9. The electronic device of claim 1, wherein the one end of the first or second ground terminals is formed on the first surface of the mid plate using a printing technique, and/or the one end of the third or fourth ground terminals is formed on the second surface of the mid plate using the printing technique.

10. The electronic device of claim 9, wherein:

the connector includes a blocking member in contact with at least a portion of the mid plate;

the blocking member includes a first blocking member in contact with the first surface of the mid plate and the first ground terminal, a second blocking member in contact with the first surface of the mid plate and the second ground terminal, a third blocking member in contact with the second surface of the mid plate and the third ground terminal, and a fourth blocking member in contact with the second surface of the mid plate and the fourth ground terminal; and wherein at least one of the first, second, third, or fourth ground terminals includes a silver (ag) material, and the blocking member includes a silver (Ag) material.

11. The electronic device of claim 1, further comprising a power terminal, and wherein the mid plate at least in part includes a plate groove formed in a shape recessed toward the length direction of the connector.

12. The electronic device of claim 11, wherein the power terminal includes a first power terminal that includes a first connection region passing through the plate groove and extended in a height direction of the connector, and a second power terminal that is disposed at a position symmetrical to the first power terminal with respect to a width direction center line of the connector and includes a second connection region passing through the plate groove and extended in the height direction of the connector.

13. The electronic device of claim 11, wherein:

at least a portion of one end of the power terminal is extended in the height direction of the connector and disposed in the plate groove; and the power terminal includes a first power terminal disposed to be spaced apart at least in part in the first direction with respect to the first surface of the mid plate, a second power terminal disposed to be spaced apart at least in part in the first direction with respect to the first surface of the mid plate and disposed symmetrically with the first power terminal with respect to a width direction center line of the connector, a third power terminal disposed to be spaced apart at least in part in the second direction with respect to the second surface of the mid plate and having one end in contact with one end of the first power terminal located in the plate groove, and a fourth power terminal disposed to be spaced apart at least in part in the second direction with respect to the second surface of the mid plate, disposed symmetrically with the third power terminal with respect to the width direction center line of the connector, and having one end in contact with one end of the second power terminal located in the plate groove.

14. The electronic device of claim 11, wherein the power terminal includes:

a first power terminal disposed to be spaced apart at least in part in the first direction with respect to the first surface of the mid plate;

a second power terminal disposed to be spaced apart at least in part in the first direction with respect to the first surface of the mid plate and disposed symmetrically with the first power terminal with respect to the width direction center line of the connector;

a third power terminal disposed to be spaced apart at least in part in the second direction with respect to the second surface of the mid plate;

a fourth power terminal disposed to be spaced apart at least in part in the second direction with respect to the second surface of the mid plate and disposed symmetrically with the third power terminal with respect to the width direction center line of the connector;

a first connection terminal located in the plate groove, connected to the first power terminal at one end, and connected to the third power terminal at the other end; and a second connection terminal located in the plate groove, connected to the second power terminal at one end, and connected to the fourth power terminal at the other end.

15. The electronic device of claim 1, further comprising a shell disposed to surround at least some of the mid plate, the insulating structure, and the plurality of terminals, and wherein the mid plate includes an extension region that is extended in a width direction of the connector toward the shell and is in contact with the shell.

16. A connector comprising:

a mid plate that includes a first surface and a second surface opposite to the first surface;

a plurality of terminals; and an insulating structure in which at least a part of the mid plate is disposed and supporting at least some of the plurality of terminals, wherein the plurality of terminals includes a first ground terminal disposed to be spaced apart at least in part in a first direction with respect to the first surface of the mid plate, a second ground terminal disposed to be spaced apart at least in part in the first direction with respect to the first surface of the mid plate and to be spaced apart from the first ground terminal, a third ground terminal disposed to be spaced apart at least in part in a second direction opposite to the first direction with respect to the second surface of the mid plate, and a fourth ground terminal disposed to be spaced apart at least in part in the second direction with respect to the second surface of the mid plate and to be space apart from the third ground terminal, wherein each of the first, second, third and fourth ground terminals is bent at a portion of one end in a direction toward the mid plate and extended from the portion to contact the mid plate, and wherein each of the first, second, third and fourth ground terminals is extended in a length direction of the connector for contacting with a printed circuit board at the other end.

17. The connector of claim 16, wherein:

each of the first ground terminal and the second ground terminal is bent at the portion of the one end in a direction toward the first surface of the mid plate and extended from the portion to come into contact with the first surface of the mid plate; and each of the third ground terminal and the fourth ground terminal is bent at the portion of the one end in a direction toward the second surface of the mid plate and extended from the portion to come into contact with the second surface of the mid plate.

18. The connector of claim 17, comprising a blocking member in contact with at least a portion of the mid plate, and wherein the blocking member includes a first blocking member in contact with the first surface of the mid plate and the first ground terminal, a second blocking member in contact with the first surface of the mid plate and the second ground terminal, a third blocking member in contact with the second surface of the mid plate and the third ground terminal, and a fourth blocking member in contact with the second surface of the mid plate and the fourth ground terminal.

19. The connector of claim 16, wherein the end of the first or second ground terminals is formed on the first surface of the mid plate using a printing technique, and/or the one end of the third or fourth ground terminals is formed on the second surface of the mid plate using a printing technique, and wherein at least one of first, second, third or fourth ground terminals includes a silver (Ag) material.

20. The connector of claim 16, further comprising a power terminal, wherein the mid plate at least in part includes a plate groove formed in a shape recessed toward the length direction of the connector, wherein at least a portion of one end of the power terminal is extended in a height direction of the connector and disposed in the plate groove, and wherein the power terminal includes a first power terminal disposed to be spaced apart at least in part in the first direction with respect to the first surface of the mid plate, a second power terminal disposed to be spaced apart at least in part in the first direction with respect to the first surface of the mid plate and disposed symmetrically with the first power terminal with respect to a width direction center line of the connector, a third power terminal disposed to be spaced apart at least in part in the second direction with respect to the second surface of the mid plate and having one end in contact with one end of the first power terminal located in the plate groove, and a fourth power terminal disposed to be spaced apart at least in part in the second direction with respect to the second surface of the mid plate, disposed symmetrically with the third power terminal with respect to the width direction center line of the connector, and having one end in contact with one end of the second power terminal located in the plate groove.

* * * * *